US011307659B2

(12) United States Patent
Sengelaub

(10) Patent No.: US 11,307,659 B2
(45) Date of Patent: Apr. 19, 2022

(54) LOW-POWER EYE TRACKING SYSTEM

(71) Applicant: Apple Inc., Cupertino, CA (US)

(72) Inventor: Tom Sengelaub, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/021,901

(22) Filed: Sep. 15, 2020

(65) Prior Publication Data

US 2021/0081038 A1 Mar. 18, 2021

Related U.S. Application Data

(60) Provisional application No. 62/902,329, filed on Sep. 18, 2019.

(51) Int. Cl.
| | |
|---|---|
| *G06F 3/01* | (2006.01) |
| *G02B 27/00* | (2006.01) |
| *G02B 27/01* | (2006.01) |
| *G06T 7/20* | (2017.01) |
| *H04N 5/232* | (2006.01) |

(52) U.S. Cl.
CPC ......... *G06F 3/013* (2013.01); *G02B 27/0093* (2013.01); *G02B 27/017* (2013.01); *G06T 7/20* (2013.01); *H04N 5/23245* (2013.01); *H04N 5/232411* (2018.08); *G02B 2027/0138* (2013.01); *G02B 2027/0178* (2013.01); *G06T 2207/10048* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2015/0109192 A1 | 4/2015 | Huang | |
| 2016/0364881 A1 | 12/2016 | Mallinson et al. | |
| 2017/0068315 A1* | 3/2017 | Kang | G06T 7/73 |
| 2017/0192236 A1 | 7/2017 | Chen | |
| 2018/0184002 A1 | 6/2018 | Thukral | |
| 2018/0271364 A1* | 9/2018 | Orlosky | G06F 3/013 |
| 2019/0197765 A1* | 6/2019 | Molyneaux | G06K 9/00201 |

(Continued)

OTHER PUBLICATIONS

U.S. Appl. No. 17/021,920, filed Sep. 15, 2020, Tom Sengelaub.
U.S. Appl. No. 17/021,912, filed Sep. 15, 2020, Tom Sengelaub.

*Primary Examiner* — Talha M Nawaz
(74) *Attorney, Agent, or Firm* — Robert C. Kowert; Kowert, Hood, Munyon, Rankin & Goetzel, P.C.

(57) ABSTRACT

Low-power eye tracking for detecting position and movements of a user's eyes in a head-mounted device (HMD). An eye tracking system for an HMD may include head odometers, eye odometers, or both head odometers and eye odometers to reduce power consumption of the system. Head odometers may be used to detect movement of the device with respect to the user's eyes, which may allow 3D reconstruction to generate 3D models of the user's eyes used in eye tracking to be performed only when movement of the device with respect to the user's eyes has been detected. Eye odometers may be used as a low-power component to track relative movement of the user's eyes with respect to the device between frames captured by the eye tracking cameras, which may allow the frame rate of the eye tracking cameras to be reduced.

20 Claims, 13 Drawing Sheets

(56) References Cited

U.S. PATENT DOCUMENTS

| | | |
|---|---|---|
| 2020/0348750 A1 | 11/2020 | Selan |
| 2021/0081039 A1 | 3/2021 | Sengelaub |
| 2021/0081040 A1 | 3/2021 | Sengelaub |

* cited by examiner

LOW-POWER EYE TRACKING SYSTEM

PRIORITY INFORMATION

This application claims benefit of priority of U.S. Provisional Application Ser. No. 62/902,329 entitled "LOW-POWER EYE TRACKING SYSTEM" filed Sep. 18, 2019, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

An eye tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

SUMMARY

Various embodiments of methods and apparatus for low-power eye tracking in virtual and mixed or augmented reality (VR/AR) applications are described.

Embodiments of methods and apparatus for tracking relative movement of a device with respect to a user's head are described in which sensors (referred to herein as head motion sensors or head odometers) are placed at one or more positions in or on the device. In some embodiments of an eye tracking system, to accurately determine the location of the user's eyes with respect to the eye tracking cameras, the controller may execute an algorithm that performs a three-dimensional (3D) reconstruction using images captured by the eye tracking cameras to generate 3D models of the user's eyes. Signals from the head odometers may be used to detect movement of the device with respect to the user's eyes. This may allow 3D reconstruction to be performed only when movement of the device with respect to the user's eyes has been detected, thus significantly reducing power consumption by the eye tracking system. In some embodiments, instead of performing 3D reconstruction when movement of the device with respect to the user's eyes has been detected, magnitude and direction of the detected motion may be determined, and 3D models of the user's eyes previously generated by the 3D reconstruction method may be adjusted according to the magnitude and direction of the detected motion of the HMD.

Embodiments of methods and apparatus for tracking relative movement of the user's eyes with respect to the HMD using eye odometers are also described. In some embodiments, sensors (referred to herein as eye motion sensors or eye odometers) are placed at one or more positions in the device to augment the eye tracking cameras. The eye odometers may be used as a low-power component to track relative movement of the user's eyes with respect to the device in intervals between the processing of frames captured by the eye tracking cameras at a frame rate.

Embodiments of methods and apparatus for tracking relative movement of the user's eyes with respect to the HMD using low-resolution images are also described. In some embodiments, the eye tracking cameras themselves may capture low-resolution frames, for example by binning pixels on the camera sensor or by capturing horizontal and vertical stripes or lines of pixels on the camera sensor rather than entire frames. This low-resolution information may be used to track relative movement of the user's eyes with respect to the device in intervals between the processing of full, high-resolution frames captured by the eye tracking cameras.

These eye tracking methods and apparatus may allow the frame rate of the eye tracking cameras to be reduced, for example from 120 frames per second to 10 frames per second or less, and may also allow 3D reconstruction to be performed much less often, thus significantly reducing power consumption by the eye tracking system. The eye tracking methods may be used alone or in combination in various embodiments.

Embodiments of HMDs that include both head odometers and eye odometers, or alternatively that include both head odometers and eye tracking cameras that capture low-resolution images to track relative movement of the eyes, are described. Embodiments of an eye tracking system for an HMD that include both head odometers and eye odometers, or alternatively both head odometers and eye tracking cameras that capture low-resolution images to track relative movement of the eyes, may, for example, further reduce the frequency at which 3D reconstruction is performed, and may also reduce the frequency at which two-dimensional (2D) image processing of frames captured by the eye tracking cameras is performed to further reduce power consumption of the eye tracking system.

Figure 1:
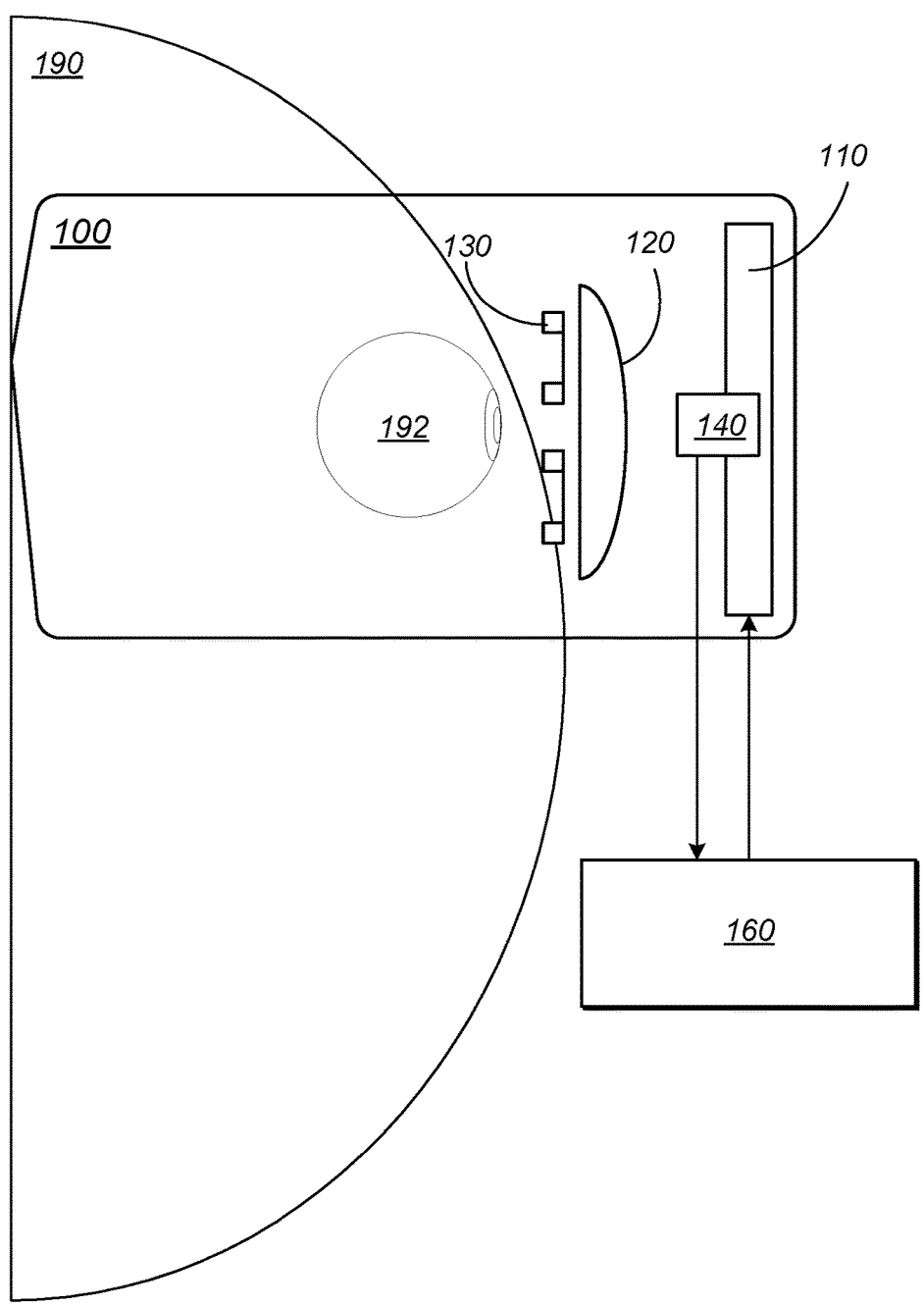
FIG. 1 illustrates an example VR/AR HMD that implements an eye tracking system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for eye tracking in virtual and mixed or augmented reality (VR/AR) applications are described. A VR/AR system may include a device such as a headset, helmet, goggles, or glasses (referred to herein as a head-mounted device (HMD)) that includes a display (e.g., left and right displays) for displaying frames including left and right images in front of a user's eyes to thus provide three-dimensional (3D) virtual views to the user. A VR/AR system may also include a controller. The controller may be implemented in the HMD, or alternatively may be implemented at least in part by an external device (e.g., a computing system) that is communicatively coupled to the HMD via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that include virtual content based at least in part on the inputs obtained from cameras and other sensors on the HMD, and may provide the frames to a projection system of the HMD for display.

The VR/AR system may include an eye tracking system (which may also be referred to as a gaze tracking system). Embodiments of an eye tracking system for VR/AR systems are described that include at least one eye tracking camera (e.g., infrared (IR) cameras) positioned at each side of the user's face and configured to capture images of the user's eyes. The eye tracking system may also include a light source (e.g., an IR light source) that emits light (e.g., IR light) towards the user's eyes. A portion of the IR light is reflected off the user's eyes to the eye tracking cameras. The eye tracking cameras, for example located at or near edges of the HMD display panel(s), capture images of the user's eyes from the IR light reflected off the eyes. Images captured by the eye tracking system may be analyzed by the controller to detect features (e.g., pupil), position, and movement of the user's eyes, and/or to detect other information about the eyes such as pupil dilation. For example, the point of gaze on the display estimated from the eye tracking images may enable gaze-based interaction with content shown on the near-eye display of the HMD. Other applications may include, but are not limited to, creation of eye image animations used for avatars in a VR/AR environment.

An HMD may be a mobile device with an internal source of power. Thus, reducing power consumption to increase the life of the power source is a concern. Eye tracking systems (both the camera and processing components) consume power. Embodiments of methods and apparatus for providing low-power eye tracking systems are described that may reduce the amount of power consumed by the eye tracking hardware and software components of an HMD.

A key to providing accurate eye tracking is knowing the location of the user's eyes with respect to the eye tracking cameras. In some embodiments of an eye tracking system, to accurately determine the location of the user's eyes with respect to the eye tracking cameras, the controller may execute an algorithm that performs a three-dimensional (3D) reconstruction using images captured by the eye tracking cameras to generate 3D models of the user's eyes. The 3D models of the eyes indicate the 3D position of the eyes with respect to the eye tracking cameras, which allows the eye tracking algorithms executed by the controller to accurately track eye movement.

A key element in accurate eye tracking is robustness in regards to device movement on the user's head. The HMD may move on the user's head during use. In addition, the user may remove the device and put it back on. In either case, an initial calibration of the eye tracking system performed using 3D reconstruction may be invalidated. However, there is an inherent ambiguity in an eye tracking system between whether the user's eyes move with respect to the cameras/HMD or whether the cameras/HMD move with respect to the user's eyes. A solution to this ambiguity is to perform the 3D reconstruction for every frame captured by the eye tracking cameras. However, 3D reconstruction is expensive computationally, and consumes a significant amount of power.

Embodiments of methods and apparatus for tracking relative movement of a device with respect to a user's head are described in which sensors (referred to herein as head motion sensors or head odometers) are placed at one or more positions in or on the device, for example at or near the user's ears to primarily track pitch and at or near the bridge of the nose to primarily track y movement. Signals from the head odometers may be used to detect movement of the device with respect to the user's eyes. This may allow 3D reconstruction to be performed only when movement of the device with respect to the user's eyes has been detected, thus significantly reducing power consumption by the eye tracking system. When no movement of the device is detected, 2D image processing of frames captured by the eye tracking cameras (which is much less expensive computationally than 3D image processing) may be performed to track the user's eyes. In some embodiments, a 3D reconstruction may be performed periodically (e.g., once a second, or once every N frames) to prevent error/drift accumulation even if movement of the device has not been detected.

In some embodiments, instead of performing 3D reconstruction when movement of the device with respect to the user's eyes has been detected, magnitude and direction of the detected motion may be determined, and 3D models of the user's eyes previously generated by the 3D reconstruction method may be adjusted according to the magnitude and direction of the detected motion of the HMD. In these embodiments, a 3D reconstruction may be performed periodically (e.g., once a second, or once every N frames) to prevent error/drift accumulation.

In addition, embodiments of methods and apparatus for reducing power consumption of an eye tracking system are described in which sensors (e.g., photosensors or photodiodes, referred to herein as eye motion sensors or eye odometers) are placed at one or more positions in the device to augment the eye tracking cameras. The eye odometers may be used as a low-power component to track relative movement of the user's eyes with respect to the device in intervals between the processing of frames captured by the eye tracking cameras. The 3D models generated from the images captured by the eye tracking cameras provide absolute gaze information, while the data captured by the eye odometers in intervals between the processing of the camera frames is processed to provide a relative update to the previously known and trusted 3D models. This may allow the frame rate of the eye tracking cameras to be reduced, for example from 120 frames per second to 10 frames per second or less, and may also allow 3D reconstruction to be performed much less often, thus significantly reducing power consumption by the eye tracking system. Reducing the frame rate of the eye tracking cameras by augmenting eye tracking with the eye odometers may also significantly reduce bandwidth usage and latency of the eye tracking system.

In addition, embodiments of methods and apparatus for reducing power consumption of an eye tracking system are described in which the eye tracking cameras may capture low-resolution frames, for example by binning pixels on the camera sensor or by capturing horizontal and vertical stripes or lines of pixels on the camera sensor rather than entire frames (high-resolution frames). This low-resolution information may be used to track relative movement of the user's eyes with respect to the device in intervals between the processing of full, high-resolution frames captured by the eye tracking cameras. This may allow 3D reconstruction to be performed much less often, thus significantly reducing power consumption by the eye tracking system. In these embodiments, the eye tracking cameras themselves may be viewed as "eye odometers" when capturing and processing the low-resolution frames. A high-resolution frame captured by a camera sensor contains more pixels than a low-resolution frame captured by the same camera sensor. A high-resolution frame may include most or all pixels that the camera sensor is capable of capturing, while a low-resolution frame may include significantly fewer pixels than the same camera sensor is capable of capturing. In some embodiments, a camera sensor may be switched, for example by a controller comprising one or more processors, from a high-resolution mode in which high-resolution frames are captured, to a low-resolution mode in which low-resolution frames are captured, for example by binning pixels on the camera sensor or by capturing horizontal and vertical stripes or lines of pixels on the camera sensor.

The head odometer methods and eye odometer methods described above may be used alone or in combination. Embodiments of HMDs that include head odometers to reduce power consumption of the eye tracking system are described. Embodiments of HMDs that include eye odometers (either implemented by sensors or by the eye tracking cameras) to reduce power consumption and bandwidth usage of the eye tracking system are also described. In addition, embodiments of HMDs that include both head odometers and eye odometers are described. Embodiments of an eye tracking system for an HMD that include both head odometers and eye odometers may, for example, further reduce the frequency at which 3D reconstruction is performed, and may also reduce the frequency at which 2D image processing of frames captured by the eye tracking cameras is performed to further reduce power consumption of the eye tracking system.

While embodiments of an eye tracking system are generally described herein as including at least one eye tracking camera positioned at each side of the user's face to track the gaze of both of the user's eyes, an eye tracking system may also be implemented that includes at least one eye tracking camera positioned at only one side of the user's face to track the gaze of only one of the user's eyes.

FIG. 1 shows a side view of an example VR/AR HMD 100 that implements an eye tracking system, according to some embodiments. Note that HMD 100 as illustrated in FIG. 1 is given by way of example, and is not intended to be limiting. In various embodiments, the shape, size, and other features of an HMD 100 may differ, and the locations, numbers, types, and other features of the components of an HMD 100 may vary. VR/AR HMD 100 may include, but is not limited to, a display 110 and two optical lenses (eyepieces) 120, mounted in a wearable housing or frame. As shown in FIG. 1, HMD 100 may be positioned on the user 190's head such that the display 110 and eyepieces 120 are disposed in front of the user's eyes 192. The user looks through the eyepieces 120 onto the display 110.

Figure 12:
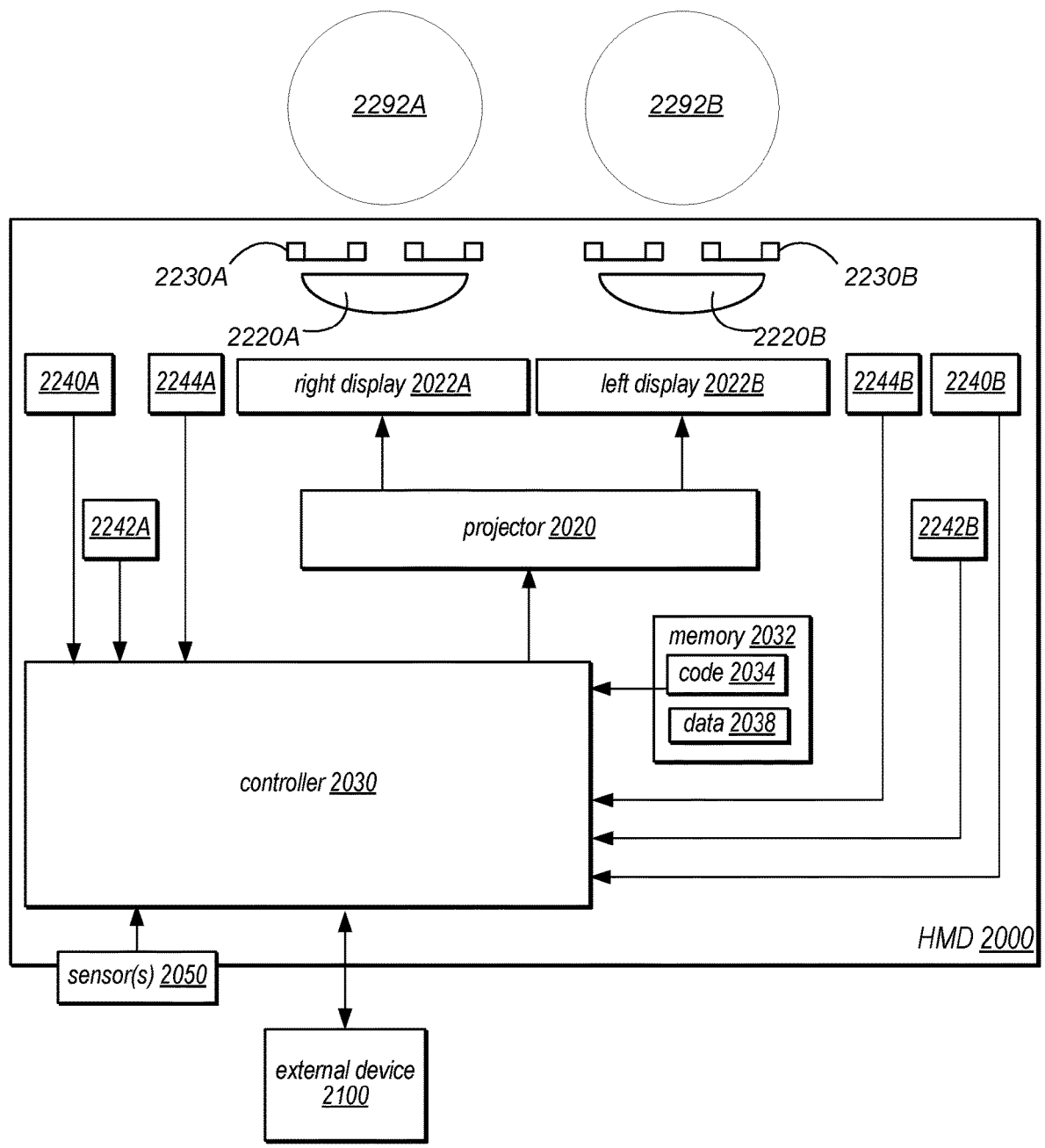
FIG. 12 is a block diagram illustrating an example VR/AR system that includes components of an eye tracking system as illustrated in FIGS. 2 through 11, according to some embodiments.

A controller 160 for the VR/AR system may be implemented in the HMD 100, or alternatively may be implemented at least in part by an external device (e.g., a computing system) that is communicatively coupled to HMD 100 via a wired or wireless interface. Controller 160 may include one or more of various types of processors, image signal processors (ISPs), graphics processing units (GPUs), coder/decoders (codecs), and/or other components for processing and rendering video and/or images. Controller 160 may render frames (each frame including a left and right image) that include virtual content based at least in part on the inputs obtained from the sensors, and may provide the frames to a projection system of the HMD 100 for display to display 110. FIG. 12 further illustrates components of an HMD and VR/AR system, according to some embodiments.

The eye tracking system may include, but is not limited to, one or more eye tracking cameras 140 and an IR light source 130. IR light source 130 (e.g., IR LEDs) may be positioned in the HMD 100 (e.g., around the eyepieces 120, or elsewhere in the HMD 100) to illuminate the user's eyes 192 with IR light. At least one eye tracking camera 140 (e.g., an IR camera, for example a 400×400 pixel count camera or a 600×600 pixel count camera, that operates at 850 nm or 940 nm, or at some other IR wavelength, and that captures frames at a rate of 60-120 frames per second (FPS)) is located at each side of the user 190's face. In various embodiments, the eye tracking cameras 140 may be positioned in the HMD 100 on each side of the user 190's face to provide a direct view of the eyes 192, a view of the eyes 192 through the eyepieces 120, or a view of the eyes 192 via reflection off hot mirrors or other reflective components. Note that the location and angle of eye tracking camera 140 is given by way of example, and is not intended to be limiting. While FIG. 1 shows a single eye tracking camera 140 located on each side of the user 190's face, in some embodiments there may be two or more eye tracking cameras 140 on each side of the user 190's face.

A portion of IR light emitted by light source(s) 130 reflects off the user 190's eyes and is captured by the eye tracking cameras 140 to image the user's eyes 192. Images captured by the eye tracking cameras 140 may be analyzed by controller 160 to detect features (e.g., pupil), position, and movement of the user's eyes 192, and/or to detect other information about the eyes 192 such as pupil dilation. For example, the point of gaze on the display 110 may be estimated from the eye tracking images to enable gaze-based interaction with content shown on the display 110. As another example, in some embodiments, the information collected by the eye tracking system may be used to adjust the rendering of images to be projected, and/or to adjust the projection of the images by the projection system of the HMD 100, based on the direction and angle at which the user 190's eyes are looking.

Embodiments of an HMD 100 with an eye tracking system as illustrated in FIG. 1 may, for example, be used in augmented or mixed (AR) applications to provide augmented or mixed reality views to the user 190. While not shown, in some embodiments, HMD 100 may include one or more sensors, for example located on external surfaces of the HMD 100, that collect information about the user 190's external environment (video, depth information, lighting information, etc.); the sensors may provide the collected information to controller 160 of the VR/AR system. In some embodiments, the sensors may include one or more visible light cameras (e.g., RGB video cameras) that capture video of the user's environment that may be used to provide the user 190 with a virtual view of their real environment. In some embodiments, video streams of the real environment captured by the visible light cameras may be processed by the controller of the HMD 100 to render augmented or mixed reality frames that include virtual content overlaid on the view of the real environment, and the rendered frames may be provided to the projection system of the HMD 100 for display on display 110. In some embodiments, the display 110 emits light in the visible light range and does not emit light in the IR range, and thus does not introduce noise in the eye tracking system. Embodiments of the HMD 100 with an eye tracking system as illustrated in FIG. 1 may also be used in virtual reality (VR) applications to provide VR views to the user 190. In these embodiments, the controller of the HMD 100 may render or obtain virtual reality (VR) frames that include virtual content, and the rendered frames may be provided to the projection system of the HMD 100 for display on display 110.

A key to providing accurate eye tracking is knowing the location of the user's eyes 192 with respect to the eye tracking cameras 140. In some embodiments of an eye tracking system, to accurately determine the location of the user's eyes with respect to the eye tracking cameras, the controller 160 may perform a 3D reconstruction using images captured by the eye tracking cameras 140 to generate 3D models of the user's eyes 192. The 3D models of the eyes 192 indicate the 3D position of the eyes 192 with respect to the eye tracking cameras 140 which allows the eye tracking algorithms executed by the controller 160 to accurately track eye movement. However, a key element in accurate eye tracking is robustness in regards to device movement on the user's head. An initial calibration performed using 3D reconstruction may be invalidated by movement or removal of the HMD 190. However, there is an inherent ambiguity in an eye tracking system between whether the user's eyes 192 move with respect to the cameras 140 or whether the cameras 140 move with respect to the user's eyes 192. A conventional solution to this ambiguity is to perform the 3D reconstruction for every frame captured by the eye tracking cameras 140. However, 3D reconstruction is expensive computationally, and consumes a significant amount of power.

Figure 2:
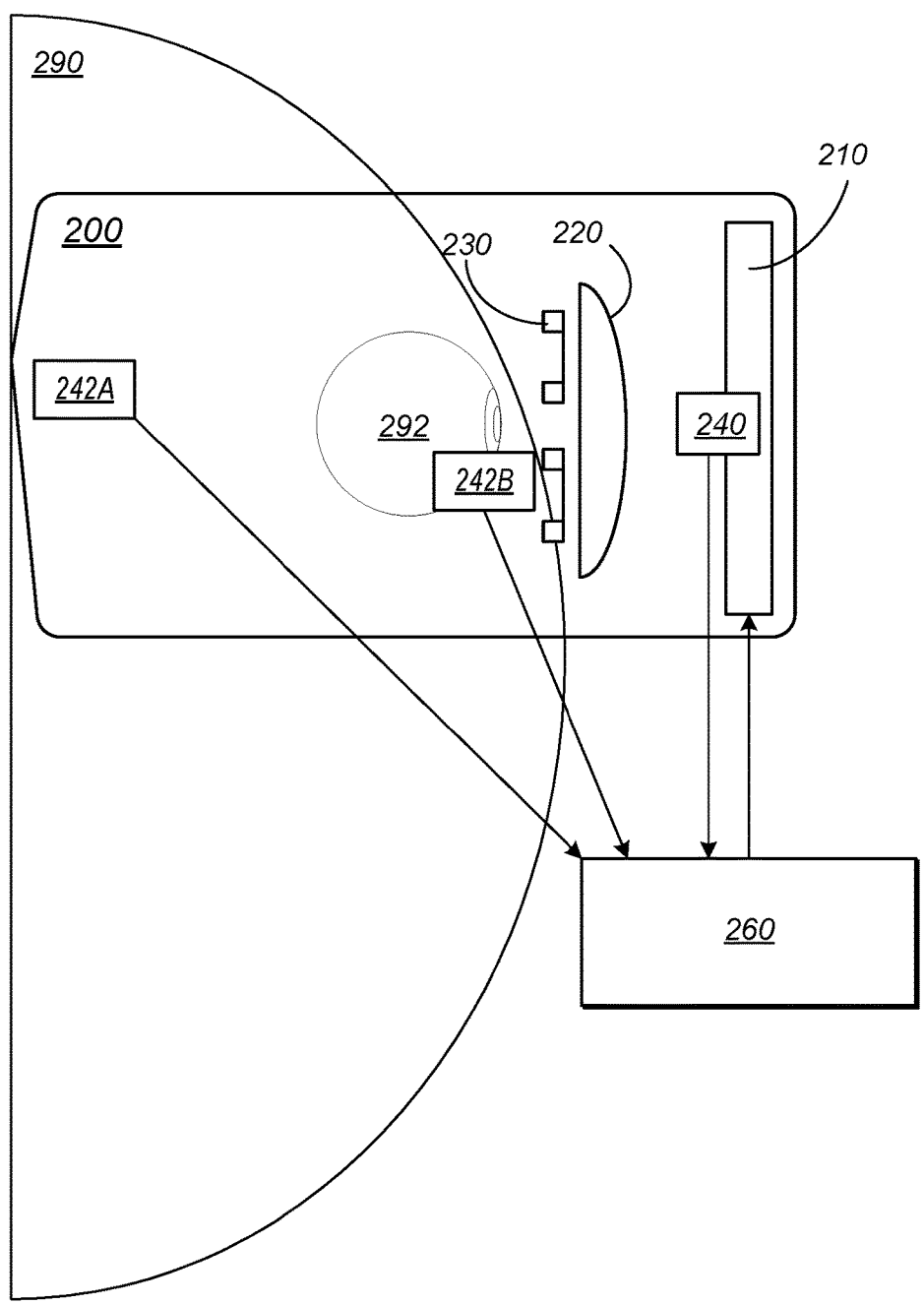
FIG. 2 illustrates an example VR/AR HMD that implements an eye tracking system that includes sensors to detect movement of the HMD with respect to the user's eyes, according to some embodiments.

FIG. 2 illustrates an example VR/AR HMD 200 that implements an eye tracking system that includes sensors (referred to as head motion sensors or head odometers) to detect movement of the HMD 200 with respect to the user's eyes 292, according to some embodiments. Note that HMD 200 as illustrated in FIG. 2 is given by way of example, and is not intended to be limiting. In various embodiments, the shape, size, and other features of an HMD 200 may differ, and the locations, numbers, types, and other features of the components of an HMD 200 may vary. VR/AR HMD 200 may include, but is not limited to, a display 210 and two eyepieces 220, mounted in a wearable housing or frame. A controller 260 for the VR/AR system may be implemented in the HMD 200, or alternatively may be implemented at least in part by an external device that is communicatively coupled to HMD 200 via a wired or wireless interface. Controller 260 may include one or more of various types of processors, image signal processors (ISPs), graphics processing units (GPUs), coder/decoders (codecs), and/or other components for processing and rendering video and/or images. FIG. 12 further illustrates components of an HMD and VR/AR system, according to some embodiments.

The HMD 200 may include an eye tracking system that includes, but is not limited to, one or more eye tracking cameras 240 and an IR light source 230. IR light source 230 (e.g., IR LEDs) may be positioned in the HMD 200 (e.g., around the eyepieces 220, or elsewhere in the HMD 200) to illuminate the user's eyes 292 with IR light. At least one eye tracking camera 240 (e.g., an IR camera, for example a 400×400 pixel count camera or a 600×600 pixel count camera, that operates at 850 nm or 940 nm, or at some other IR wavelength, and that captures frames at a rate of 60-120 frames per second (FPS)) is located at each side of the user 290's face. In various embodiments, the eye tracking cameras 240 may be positioned in the HMD 200 on each side of the user 290's face to provide a direct view of the eyes 292, a view of the eyes 292 through the eyepieces 220, or a view of the eyes 292 via reflection off hot mirrors or other reflective components. Note that the location and angle of eye tracking camera 240 is given by way of example, and is not intended to be limiting. While FIG. 2 shows a single eye tracking camera 240 located on each side of the user 290's face, in some embodiments there may be two or more eye tracking cameras 240 on each side of the user 290's face.

To track relative movement of the HMD 200 with respect to the user's eyes, the eye tracking system may also include sensors 242 (referred to herein as head motion sensors or head odometers) placed at one or more positions in or on the device, for example at or near the user's ears (242A) to primarily track pitch and at or near the bridge of the nose (242B) to primarily track y movement. Signals from the head odometers 242A and 242B may be used to detect movement of the HMD 200 with respect to the user's eyes. This may allow 3D reconstruction to be performed only when movement of the HMD 200 with respect to the user's eyes has been detected, thus significantly reducing power consumption by the eye tracking system. When no movement of the HMD 200 is detected, 2D image processing of frames captured by the eye tracking cameras 240 (which is much less expensive computationally than 3D image processing) may be performed to track the user's eyes 292. In some embodiments, a 3D reconstruction may be performed periodically (e.g., once a second, or once every N frames) to prevent error/drift accumulation even if movement of the HMD 200 has not been detected.

In some embodiments, instead of performing 3D reconstruction when movement of the HMD 200 with respect to the user's eyes 292 has been detected, magnitude and direction of the detected motion may be determined, and 3D models of the user's eyes 292 previously generated by the 3D reconstruction method may be adjusted according to the magnitude and direction of the detected motion of the HMD 200. In these embodiments, a 3D reconstruction may be performed periodically (e.g., once a second, or once every N frames) to prevent error/drift accumulation.

Examples of different technologies that may be used to implement head odometers 242 in an eye tracking system are given below in the section titled Example sensors.

Figure 3:
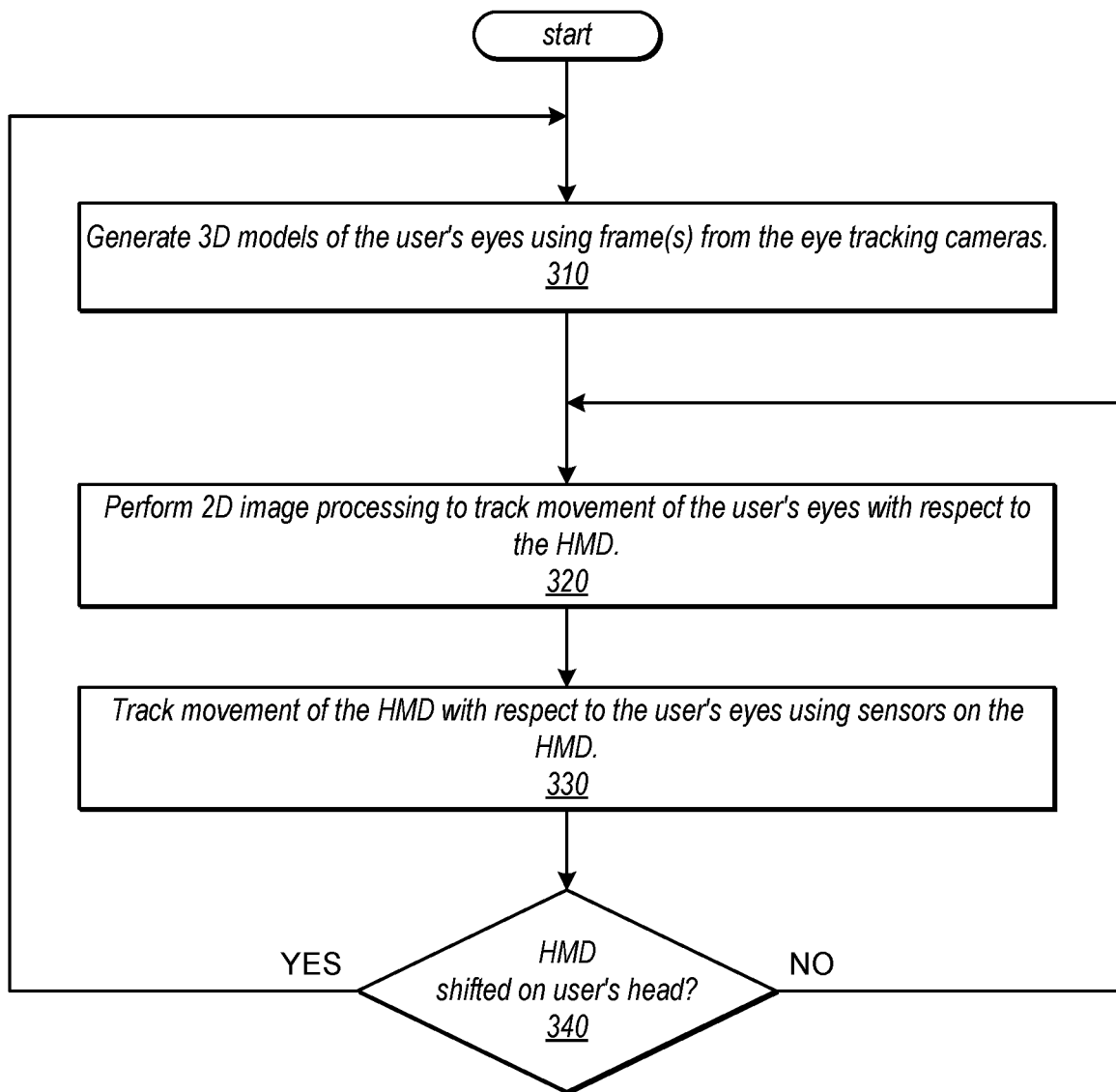
FIG. 3 is a flowchart of an eye tracking method in which sensors are used to detect movement of the HMD with respect to the user's eyes and in which 3D reconstruction is performed only when movement of the HMD is detected, according to some embodiments.

FIG. 3 is a flowchart of an eye tracking method in which sensors are used to detect movement of the HMD with respect to the user's eyes and in which 3D reconstruction is performed only when movement of the HMD is detected, according to some embodiments. The method of FIG. 3 may, for example, be performed in a VR/AR system as illustrated in FIG. 2.

As indicated at 310, a 3D reconstruction method may be performed to generate 3D models of the user's eyes using frame(s) captured by the eye tracking cameras. For example, the 3D reconstruction may be performed at initialization/calibration of the HMD. The 3D models of the eyes indicate the 3D position of the eyes with respect to the eye tracking cameras, which allows the eye tracking algorithms executed by the controller to accurately track eye movement with respect to the HMD.

As indicated at 320, 2D image processing of frames captured by the eye tracking cameras may be performed to track movement of the user's eyes with respect to the HMD. The eye movement tracked by the 2D image processing may, for example, be used to determine the point of gaze on the display of the HMD.

As indicated at 330, relative movement of the HMD with respect to the user's head may be tracked using sensors on the HMD. A key element in accurate eye tracking is robustness in regards to device movement on the user's head. If the HMD moves on the user's head during use, the initial calibration of the eye tracking system performed at element 310 using 3D reconstruction may be invalidated. However, there is an inherent ambiguity in an eye tracking system between whether the user's eyes move with respect to the cameras/HMD or whether the cameras/HMD move with respect to the user's eyes. To track movement of the HMD with respect to the user's eyes, sensors (referred to as head motion sensors or head odometers) are placed at one or more positions in or on the HMD, for example as illustrated in FIG. 2. Signals from the head odometers may be processed by the controller to track movement of the HMD with respect to the user's eyes.

At 340, as long as the controller does not detect movement of the HMD with respect to the user's eyes from the head odometer signals, the eye tracking method may continue to perform 2D image processing to track movement of the user's eyes with respect to the HMD as indicated at 320.

At 340, if the controller detects movement of the HMD with respect to the user's eyes, the method returns to element 310 to again perform the 3D reconstruction method to generate new 3D models of the user's eyes using frame(s) captured by the eye tracking cameras, which allows the eye tracking algorithms executed by the controller to continue to accurately track eye movement with respect to the HMD.

The method of FIG. 3 may allow 3D reconstruction to be performed only when movement of the HMD with respect to the user's eyes has been detected, thus significantly reducing power consumption by the eye tracking system. When no movement of the HMD is detected, 2D image processing of frames captured by the eye tracking cameras (which is much less expensive computationally than 3D image processing) may be performed to track the user's eyes. In some embodiments, a 3D reconstruction may be performed periodically (e.g., once a second, or once every N frames) to prevent error/drift accumulation even if movement of the HMD with respect to the user's eyes has not been detected.

Figure 4:
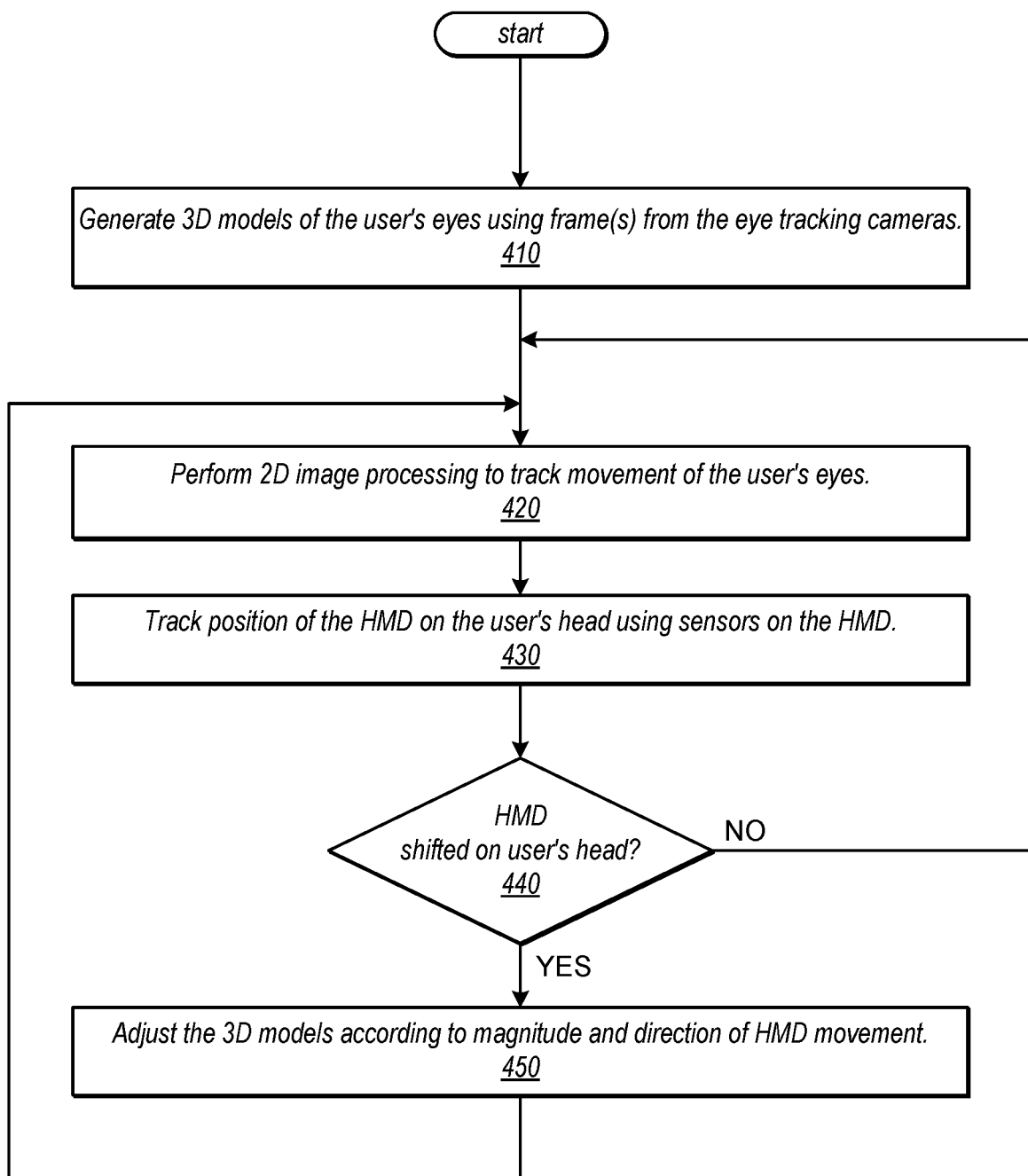
FIG. 4 is a flowchart of an eye tracking method in which sensors are used to detect movement of the HMD with respect to the user's eyes and in which a 3D model of the eye is adjusted when movement of the HMD is detected, according to some embodiments.

FIG. 4 is a flowchart of an eye tracking method in which sensors are used to detect movement of the HMD with respect to the user's eyes and in which a 3D model of the eye is adjusted when movement of the HMD is detected, according to some embodiments. The method of FIG. 4 may, for example, be performed in a VR/AR system as illustrated in FIG. 2.

As indicated at 420, 2D image processing of frames captured by the eye tracking cameras may be performed to track movement of the user's eyes with respect to the HMD. The eye movement tracked by the 2D image processing may, for example, be used to determine the point of gaze on the display of the HMD.

As indicated at 430, relative movement of the HMD with respect to the user's head may be tracked using sensors on the HMD. To track movement of the HMD with respect to the user's eyes, sensors (referred to as head motion sensors or head odometers) are placed at one or more positions in or on the HMD, for example as illustrated in FIG. 2. Signals from the head odometers may be processed by the controller to track movement of the HMD with respect to the user's eyes.

At 440, as long as the controller does not detect movement of the HMD with respect to the user's eyes from the head odometer signals, the eye tracking method may continue to perform 2D image processing to track movement of the user's eyes with respect to the HMD as indicated at 420. At 440, if the controller detects movement of the HMD with respect to the user's eyes, then as indicated at 450 the 3D models generated at 410 may be adjusted by the controller, and the method may continue to perform 2D image processing to track movement of the user's eyes with respect to the HMD as indicated at 420. Magnitude and direction of the movement may be determined from the head odometer signals. This information may then be used by the controller to adjust the 3D models, which allows the eye tracking algorithms executed by the controller to continue to accurately track eye movement with respect to the HMD using 2D image processing without requiring expensive 3D reconstruction to be performed. However, in some embodiments, a 3D reconstruction may be performed periodically (e.g., once a second, or once every N frames) to recalibrate the eye tracking system.

The method of FIG. 4 may allow 3D reconstruction to be performed less frequently than the method of FIG. 3, thus further reducing power consumption by the eye tracking system. When no movement of the HMD is detected, 2D image processing of frames captured by the eye tracking cameras (which is much less expensive computationally than 3D image processing) may be performed to track the user's eyes. When movement is detected, the 3D models can be adjusted without requiring an expensive 3D reconstruction. A 3D reconstruction may need to be performed only occasionally to prevent error/drift accumulation.

Figure 5:
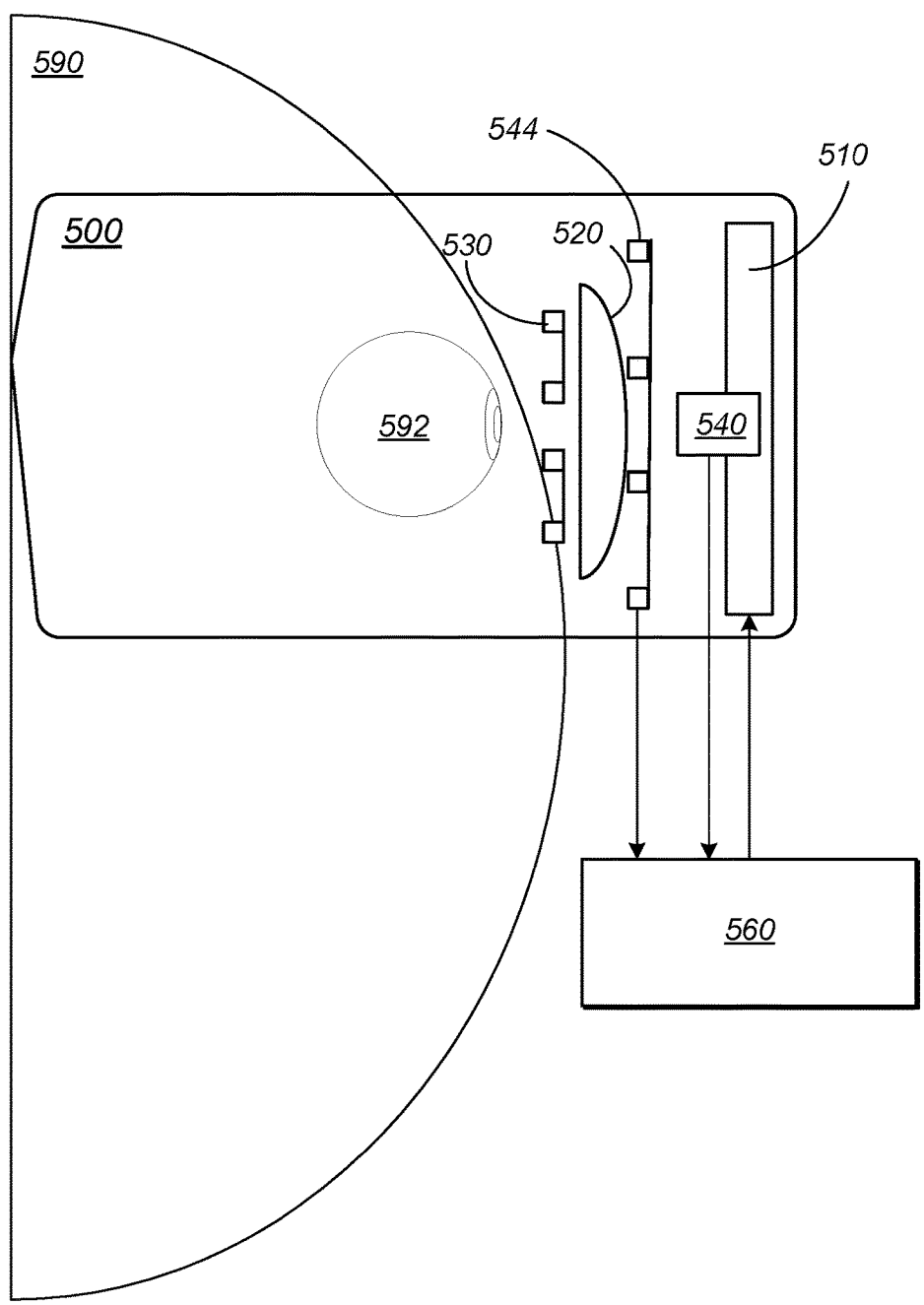
FIG. 5 illustrates an example VR/AR HMD that implements an eye tracking system that includes sensors that are used to track movement of the eyes in intervals between the processing of frames captured by the eye tracking cameras, according to some embodiments.

FIG. 5 illustrates an example VR/AR HMD that implements an eye tracking system that includes sensors that are used to track movement of the eyes in intervals between the processing of frames captured by the eye tracking cameras, according to some embodiments. Note that HMD 500 as illustrated in FIG. 5 is given by way of example, and is not intended to be limiting. In various embodiments, the shape, size, and other features of an HMD 500 may differ, and the locations, numbers, types, and other features of the components of an HMD 500 may vary. VR/AR HMD 500 may include, but is not limited to, a display 510 and two eyepieces 520, mounted in a wearable housing or frame. A controller 560 for the VR/AR system may be implemented in the HMD 500, or alternatively may be implemented at least in part by an external device that is communicatively coupled to HMD 500 via a wired or wireless interface. Controller 560 may include one or more of various types of processors, image signal processors (ISPs), graphics processing units (GPUs), coder/decoders (codecs), and/or other components for processing and rendering video and/or images. FIG. 12 further illustrates components of an HMD and VR/AR system, according to some embodiments.

The HMD 500 may include an eye tracking system that includes, but is not limited to, one or more eye tracking cameras 540 and an IR light source 530. IR light source 530 (e.g., IR LEDs) may be positioned in the HMD 500 (e.g., around the eyepieces 520, or elsewhere in the HMD 500) to illuminate the user's eyes 592 with IR light. At least one eye tracking camera 540 (e.g., an IR camera, for example a 400×400 pixel count camera or a 600×600 pixel count camera, that operates at 850 nm or 940 nm, or at some other IR wavelength, and that may be capable of capturing frames at a rate of 60-120 frames per second (FPS)) is located at each side of the user 590's face. In various embodiments, the eye tracking cameras 540 may be positioned in the HMD 500 on each side of the user 590's face to provide a direct view of the eyes 592, a view of the eyes 592 through the eyepieces 520, or a view of the eyes 592 via reflection off hot mirrors or other reflective components. Note that the location and angle of eye tracking camera 540 is given by way of example, and is not intended to be limiting. While FIG. 5 shows a single eye tracking camera 540 located on each side of the user 590's face, in some embodiments there may be two or more eye tracking cameras 540 on each side of the user 590's face.

To track relative movement of the user's eyes 592 with respect to the HMD 500, the eye tracking system may also include sensors 544 (e.g., photosensors or photodiodes, referred to herein as eye motion sensors or eye odometers) placed at one or more positions in the HMD 500 to augment the eye tracking cameras 540. The eye odometers 544 may be used as a low-power component to track relative movement of the user's eyes 592 with respect to the HMD 500 in intervals between the processing of frames captured by the cameras 540 to generate 3D models of the user's eyes. The 3D models generated from the images captured by the eye tracking cameras 540 provide absolute gaze information at the frame rate of the cameras, while the data captured by the eye odometers 544 is processed in intervals between the processing of the camera frames to provide relative updates to the 3D models generated from the captured images. This may allow the frame rate of the eye tracking cameras 540 to be reduced, for example from 120 frames per second to 10 frames per second or less, and may also allow 3D reconstruction based on the captured frames to be performed much less often (e.g., 10 times a second or less), thus significantly reducing power consumption by the eye tracking system. Reducing the frame rate of the eye tracking cameras 540 by augmenting eye tracking with the eye odometers 544 may also significantly reduce bandwidth usage and latency of the eye tracking system. Examples of different technologies that may be used to implement eye odometers 544 in an eye tracking system are given below in the section titled Example sensors.

Figure 6:
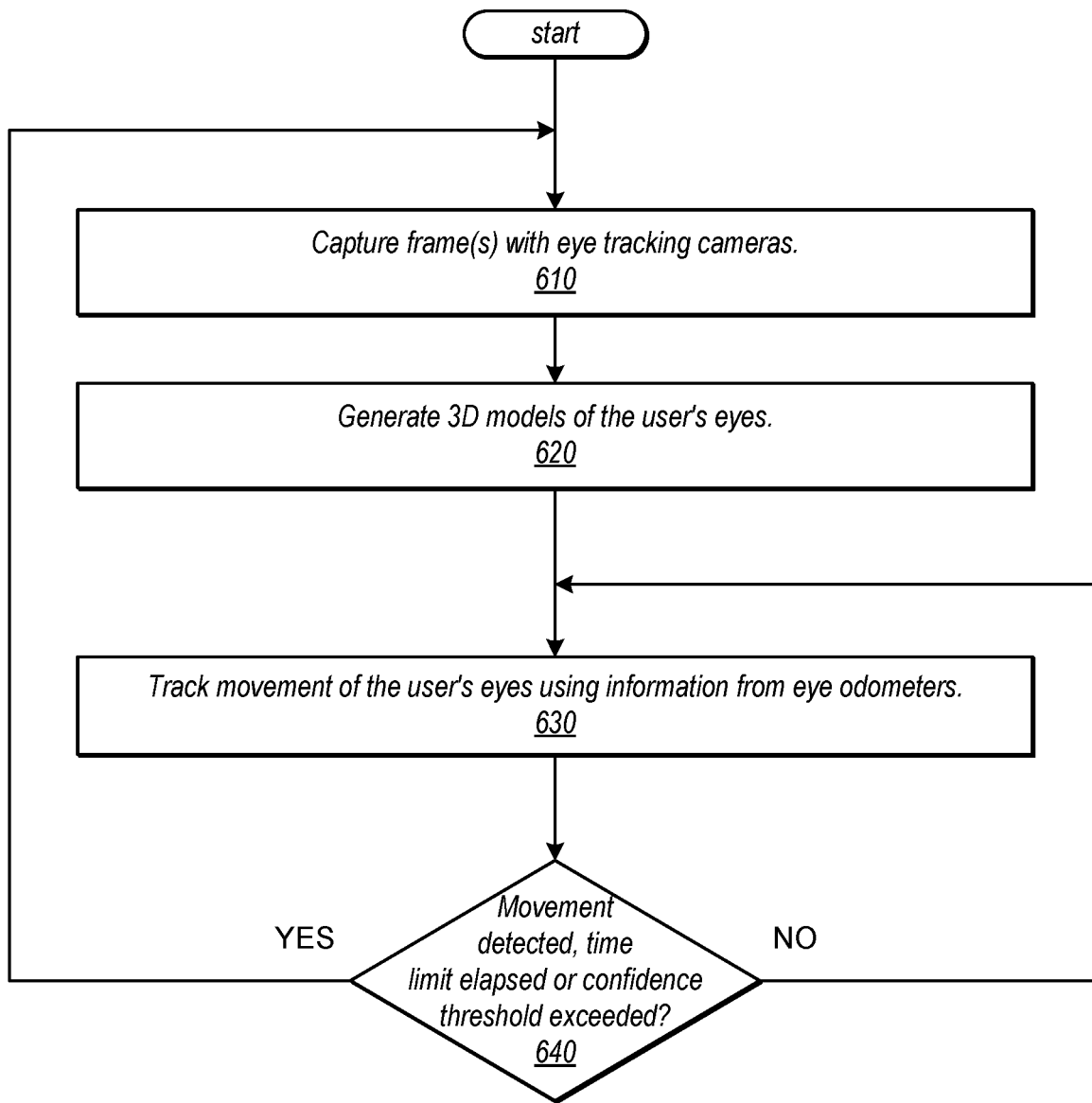
FIG. 6 is a flowchart of an eye tracking method in which sensors are used to track movement of the eyes in intervals between the processing of frames captured by the eye tracking cameras, according to some embodiments.

FIG. 6 is a flowchart of an eye tracking method in which sensors are used to track movement of the eyes in intervals between the processing of frames captured by the eye tracking cameras, according to some embodiments. The method of FIG. 6 may, for example, be performed in a VR/AR system as illustrated in FIG. 5. As indicated at 610, one or more frames may be captured by the eye tracking cameras. As indicated at 620, a 3D reconstruction method may be performed to generate 3D models of the user's eyes using the frame(s) captured by the eye tracking cameras. For example, the 3D reconstruction may be performed at initialization/calibration of the HMD. The 3D models of the eyes indicate the 3D position of the eyes with respect to the eye tracking cameras, which allows the eye tracking algorithms executed by the controller to accurately track eye movement with respect to the HMD.

As indicated at 630, after performing an initial 3D reconstruction to generate 3D models of the eyes, relative movement of the user's eyes with respect to the HMD may be tracked using data captured by and collected from the eye odometers (e.g., photosensors or photodiodes). At 640, the eye tracking system may continue to track the user's eyes using the data from the eye odometers until movement of the HMD with respect to the user's head is detected, a time limit elapses or a confidence threshold in the eye odometer data is exceeded. If movement of the HMD with respect to the user's head is detected, the time limit has elapsed or the confidence threshold has been exceeded, the method returns to element 610 to capture one or more frames using the eye tracking cameras and perform the 3D reconstruction method 620 to generate new 3D models of the user's eyes using frame(s) captured by the eye tracking cameras. The method then resumes tracking the eyes using the eye odometer information at 630.

Figure 7:
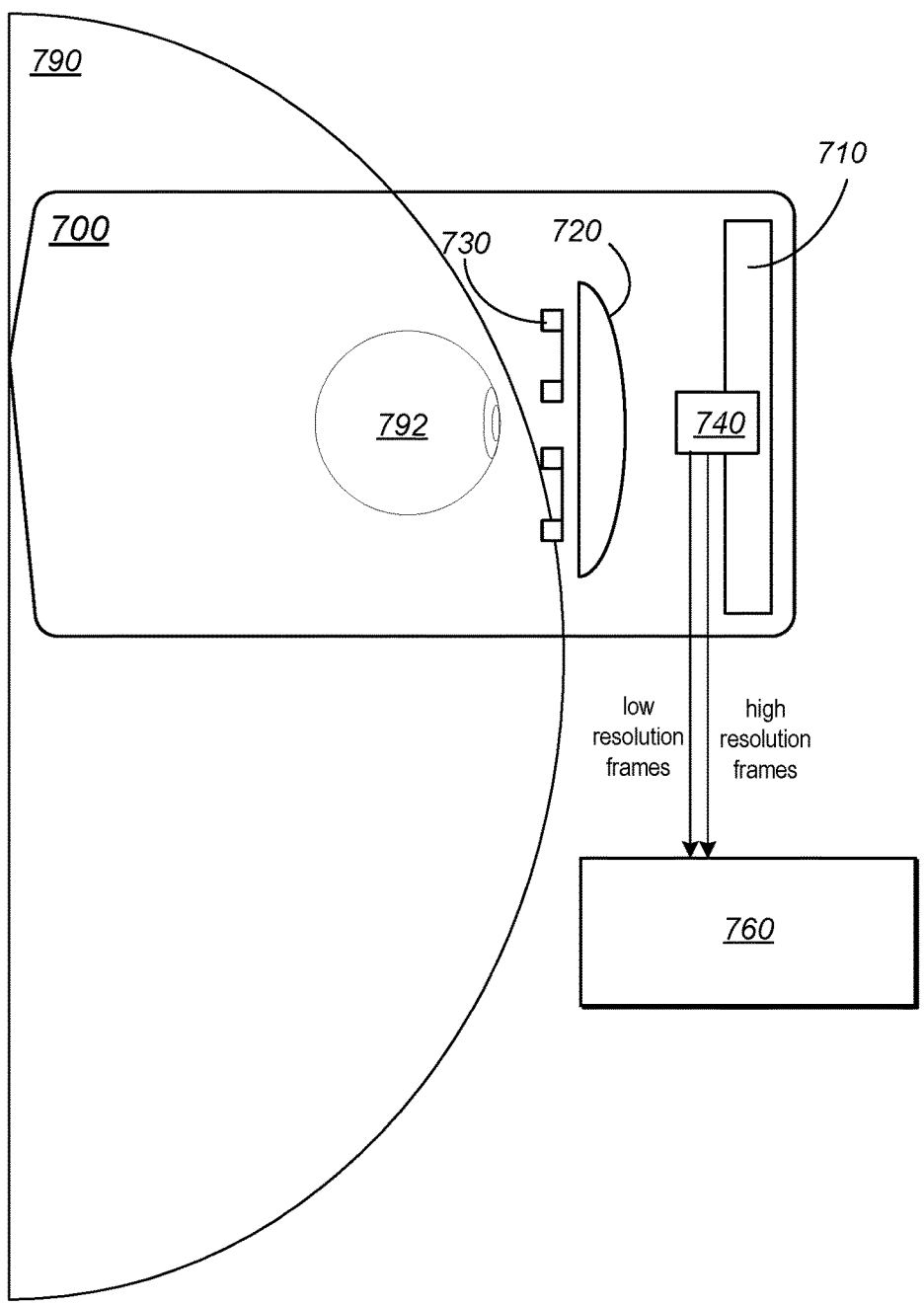
FIG. 7 illustrates an example VR/AR HMD that implements an eye tracking system in which low-resolution frames are captured by the eye tracking cameras and used to track movement of the eyes in intervals between the processing of high-resolution frames captured by the eye tracking cameras, according to some embodiments.

FIG. 7 illustrates an example VR/AR HMD that implements an eye tracking system in which low-resolution frames are captured by the eye tracking cameras and used to track movement of the eyes in intervals between the processing of high-resolution frames captured by the eye tracking cameras, according to some embodiments. Note that HMD 700 as illustrated in FIG. 7 is given by way of example, and is not intended to be limiting. In various embodiments, the shape, size, and other features of an HMD 700 may differ, and the locations, numbers, types, and other features of the components of an HMD 700 may vary. VR/AR HMD 700 may include, but is not limited to, a display 710 and two eyepieces 720, mounted in a wearable housing or frame. A controller 760 for the VR/AR system may be implemented in the HMD 700, or alternatively may be implemented at least in part by an external device that is communicatively coupled to HMD 700 via a wired or wireless interface. Controller 760 may include one or more of various types of processors, image signal processors (ISPs), graphics processing units (GPUs), coder/decoders (codecs), and/or other components for processing and rendering video and/or images. FIG. 12 further illustrates components of an HMD and VR/AR system, according to some embodiments.

The HMD 700 may include an eye tracking system that includes, but is not limited to, one or more eye tracking cameras 740 and an IR light source 730. IR light source 730 (e.g., IR LEDs) may be positioned in the HMD 700 (e.g., around the eyepieces 720, or elsewhere in the HMD 700) to illuminate the user's eyes 792 with IR light. At least one eye tracking camera 740 (e.g., an IR camera, for example a 400×400 pixel count camera or a 600×600 pixel count camera, that operates at 850 nm or 940 nm, or at some other IR wavelength, and that captures frames at a rate of 60-120 frames per second (FPS)) is located at each side of the user 790's face. In various embodiments, the eye tracking cameras 740 may be positioned in the HMD 700 on each side of the user 790's face to provide a direct view of the eyes 792, a view of the eyes 792 through the eyepieces 720, or a view of the eyes 792 via reflection off hot mirrors or other reflective components. Note that the location and angle of eye tracking camera 740 is given by way of example, and is not intended to be limiting. While FIG. 7 shows a single eye tracking camera 740 located on each side of the user 790's face, in some embodiments there may be two or more eye tracking cameras 740 on each side of the user 790's face.

Figure 8A:
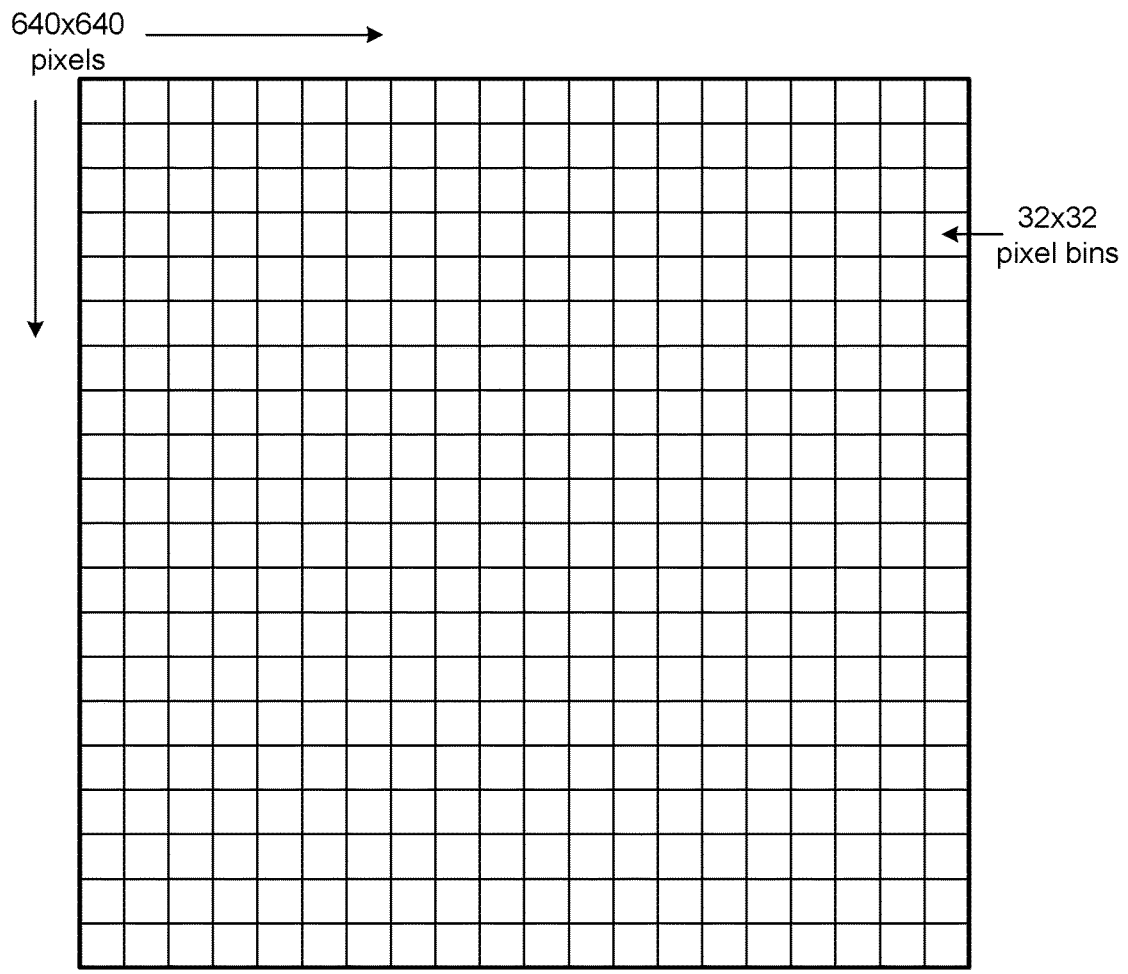
FIGS. 8A and 8B illustrate example low-resolution frames captured by the eye tracking cameras, according to some embodiments.
Figure 8B:
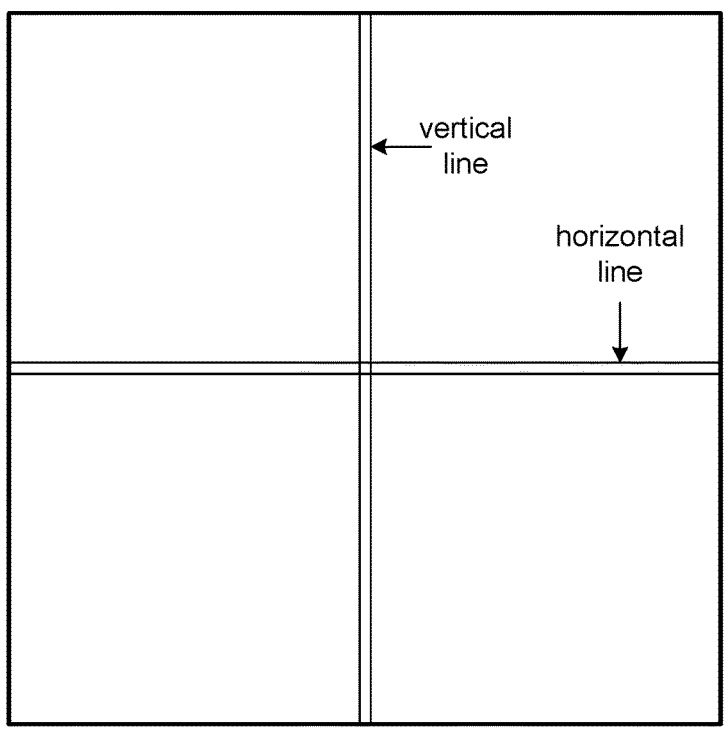

To track relative movement of the user's eyes 792 with respect to the HMD 700, instead of including eye odometers 544 in the HMD 500 as shown in FIG. 5, the eye tracking cameras 740 may capture low-resolution frames, for example by binning pixels on the camera sensor as shown in FIG. 8A or by capturing horizontal and vertical stripes of pixels on the camera sensor rather than entire frames as shown in FIG. 8B. In these embodiments, the cameras 740 may operate in high-resolution mode or in low-resolution mode. The controller 760 may signal the cameras 740 to switch to low-resolution mode during or after processing one or more high-resolution frames to generate 3D models of the eyes 792, and signal the cameras 740 to switch to high-resolution mode, for example upon detecting movement of the HMD 700 with respect to the user's head 790. The low-resolution images may be used to track relative movement of the user's eyes 792 with respect to the HMD 700 in intervals between the processing of full, high-resolution frames captured by the eye tracking cameras by the controller 760. This may allow high-resolution frames to be captured much less often, and also 3D reconstruction to be performed much less often, thus significantly reducing power consumption by the cameras 740 and controller 760 in the eye tracking system. Reducing the number of high-resolution frames that are captured and processed may also significantly reduce bandwidth usage and latency of the eye tracking system. The eye tracking cameras 740 themselves may thus be viewed as "eye odometers" when capturing and processing the low-resolution frames in intervals between the capturing and processing of high-resolution frames.

FIGS. 8A and 8B illustrate non-limiting example low-resolution frames that may be captured by an eye tracking camera 740 of FIG. 7, according to some embodiments. FIG. 8A shows an example of a frame at 640×640 resolution (400k pixels) in high-resolution mode. In low-resolution mode, the camera 740 bins 32×32 blocks of pixels into one pixel, thus resulting in 20×20 resolution (400 pixels) that may be processed in 2D to track movement of the user's eyes in intervals between capturing and processing full, high-resolution frames in 3D. FIG. 8B shows an example in which horizontal and vertical lines of pixels are captured rather than an entire frame in low-resolution mode. The captured lines may be processed in 2D to track movement of the user's eyes in intervals between capturing and processing full, high-resolution frames in 3D.

Figure 9:
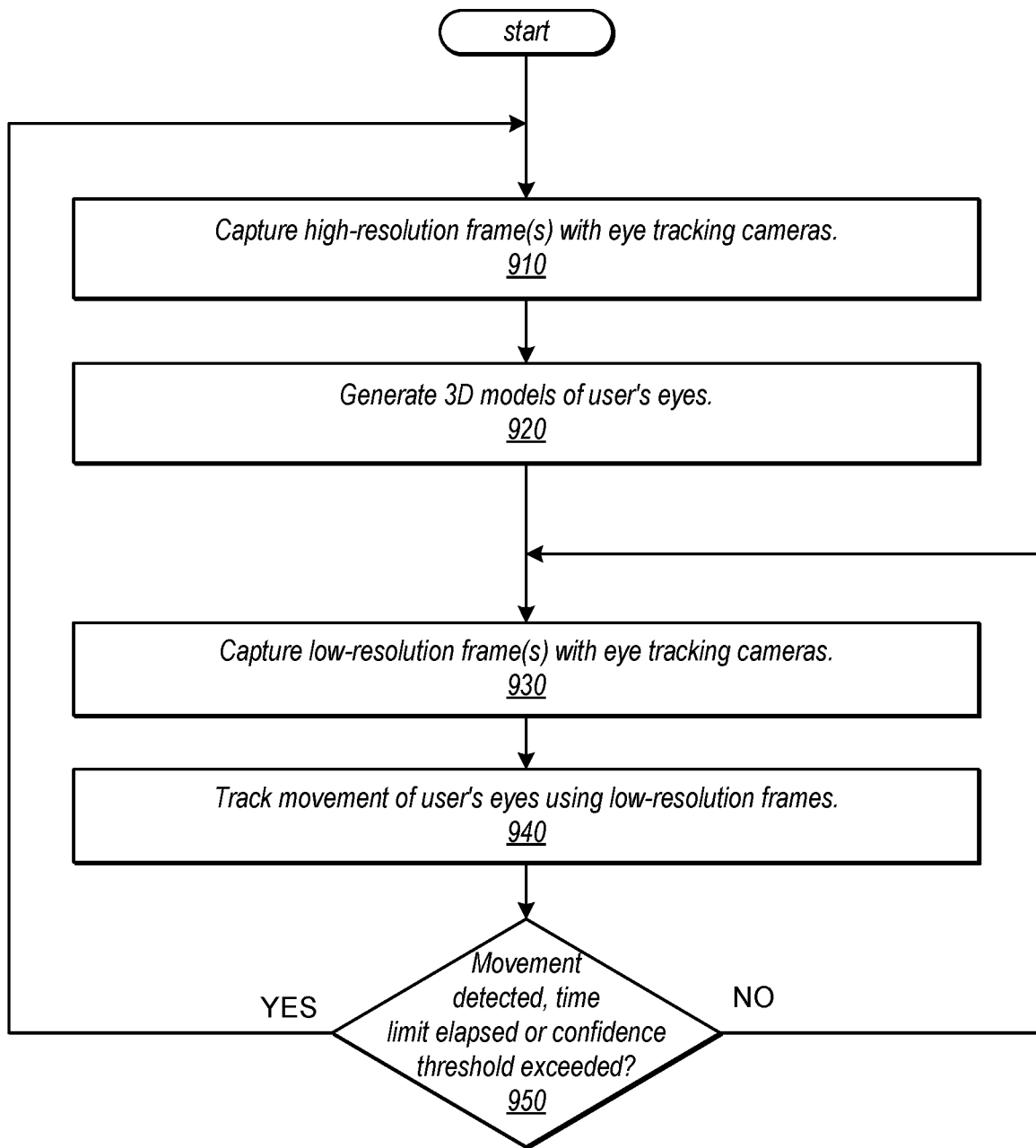
FIG. 9 is a flowchart of an eye tracking method in which low-resolution frames are captured by the eye tracking cameras and used to track movement of the eyes in intervals between the processing of high-resolution frames captured by the eye tracking cameras, according to some embodiments.

FIG. 9 is a flowchart of an eye tracking method in which low-resolution frames are captured by the eye tracking cameras and used to track movement of the eyes in intervals between the processing of high-resolution frames captured by the eye tracking cameras, according to some embodiments. The method of FIG. 9 may, for example, be performed in a VR/AR system as illustrated in FIG. 7. As indicated at 910, one or more high-resolution frames may be captured by the eye tracking cameras. As indicated at 920, a 3D reconstruction method may be performed to generate 3D models of the user's eyes using the high-resolution frame(s) captured by the eye tracking cameras. For example, the 3D reconstruction may be performed at initialization/calibration of the HMD. The 3D models of the eyes indicate the 3D position of the eyes with respect to the eye tracking cameras, which allows the eye tracking algorithms executed by the controller to accurately track eye movement with respect to the HMD.

As indicated at 930, after performing an initial 3D reconstruction to generate 3D models of the eyes, the eye tracking cameras may switch to low-resolution mode to capture low-resolution frames, for example by binning pixels on the camera sensor as illustrated in FIG. 8A or by capturing horizontal and vertical lines of pixels on the camera sensor as illustrated in FIG. 8B. In some embodiments, the controller may signal the eye tracking cameras to switch to low-resolution mode during or after processing captured high-resolution frames(s) to generate 3D models of the eyes. As indicated at 940, movement of the user's eyes with respect to the HMD may be tracked using the low-resolution images captured in low-resolution mode. At 950, the eye tracking system may continue to capture low-resolution images and track the user's eyes with respect to the HMD using the low-resolution information until movement of the HMD with respect to the user's head is detected, a time limit elapses, or a confidence threshold is exceeded. At 950, if movement of the HMD with respect to the user's head is detected, the time limit has elapsed, or the confidence threshold has been exceeded, the method returns to element 910 to capture one or more high-resolution frames using the eye tracking cameras and perform the 3D reconstruction method 920 to generate new 3D models of the user's eyes using frame(s) captured by the eye tracking cameras. In some embodiments, the controller may signal the eye tracking cameras to switch to high-resolution mode upon detecting movement of the HMD with respect to the user's head, determining that the time limit has elapsed, or determining that the confidence threshold has been exceeded. The eye tracking system then resumes capturing low-resolution images at 930 and tracking the eyes using the low-resolution images at 940.

The head odometer methods and eye odometer methods described above in reference to FIGS. 2 through 9 may be used in combination. Embodiments of HMDs that include both head odometers and eye odometers are described in reference to FIGS. 10 and 11.

Figure 10:
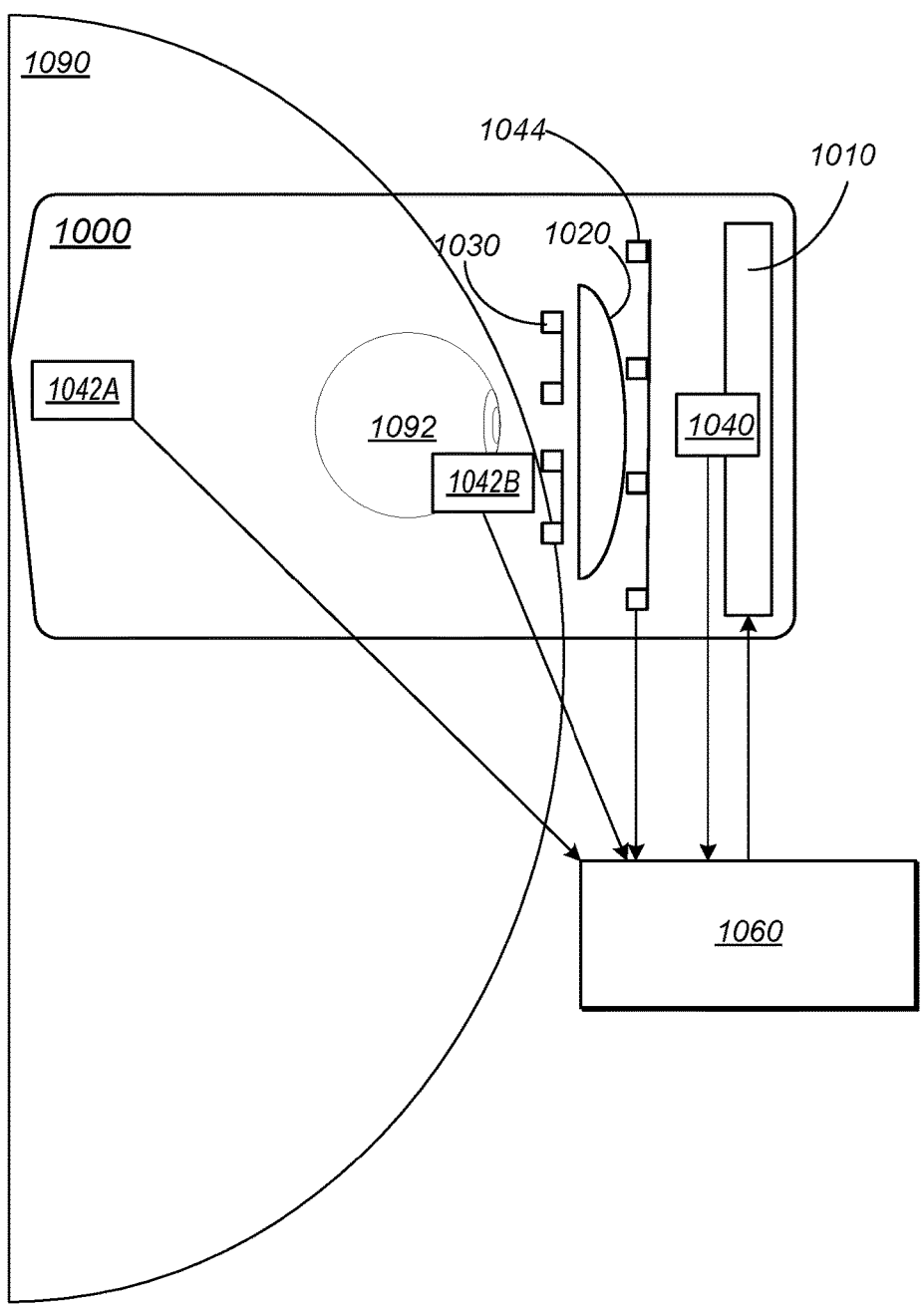
FIG. 10 illustrates an example VR/AR HMD that implements an eye tracking system that includes head odometers that detect movement of the HMD with respect to the user's eyes and eye odometers that track movement of the eyes in intervals between the processing of frames captured by the eye tracking cameras, according to some embodiments.

FIG. 10 illustrates an example VR/AR HMD that implements an eye tracking system that includes head odometers that detect movement of the HMD with respect to the user's eyes and eye odometers that track movement of the eyes in intervals between the processing of frames captured by the eye tracking cameras, according to some embodiments. Note that HMD 1000 as illustrated in FIG. 10 is given by way of example, and is not intended to be limiting. In various embodiments, the shape, size, and other features of an HMD 1000 may differ, and the locations, numbers, types, and other features of the components of an HMD 1000 may vary. VR/AR HMD 1000 may include, but is not limited to, a display 1010 and two eyepieces 1020, mounted in a wearable housing or frame. A controller 1060 for the VR/AR system may be implemented in the HMD 1000, or alternatively may be implemented at least in part by an external device that is communicatively coupled to HMD 1000 via a wired or wireless interface. Controller 1060 may include one or more of various types of processors, image signal processors (ISPs), graphics processing units (GPUs), coder/decoders (codecs), and/or other components for processing and rendering video and/or images. FIG. 12 further illustrates components of an HMD and VR/AR system, according to some embodiments.

The HMD 1000 may include an eye tracking system that includes, but is not limited to, one or more eye tracking cameras 1040 and an IR light source 1030. IR light source 1030 (e.g., IR LEDs) may be positioned in the HMD 1000 (e.g., around the eyepieces 1020, or elsewhere in the HMD 1000) to illuminate the user's eyes 1092 with IR light. At least one eye tracking camera 1040 (e.g., an IR camera, for example a 400×400 pixel count camera or a 600×600 pixel count camera, that operates at 850 nm or 940 nm, or at some other IR wavelength, and that captures frames at a rate of 60-120 frames per second (FPS)) is located at each side of the user 1090's face. In various embodiments, the eye tracking cameras 1040 may be positioned in the HMD 1000 on each side of the user 1090's face to provide a direct view of the eyes 1092, a view of the eyes 1092 through the eyepieces 1020, or a view of the eyes 1092 via reflection off hot mirrors or other reflective components. Note that the location and angle of eye tracking camera 1040 is given by way of example, and is not intended to be limiting. While FIG. 10 shows a single eye tracking camera 1040 located on each side of the user 1090's face, in some embodiments there may be two or more eye tracking cameras 1040 on each side of the user 1090's face.

To track relative movement of the HMD 1000 with respect to the user's eyes, the eye tracking system may also include head odometers 1042 placed at one or more positions in or on the device, for example at or near the user's ears (1042A) to primarily track pitch and at or near the bridge of the nose (1042B) to primarily track y movement. Signals from the head odometers 1042A and 1042B may be processed by controller 1060 to detect movement of the HMD 1000 with respect to the user's eyes. This may allow 3D reconstruction to be performed by controller 1060 only when movement of the HMD 1000 with respect to the user's eyes has been detected, thus significantly reducing power consumption by the eye tracking system. In some embodiments, instead of performing 3D reconstruction when movement of the HMD 1000 with respect to the user's eyes 1092 has been detected, magnitude and direction of the detected motion may be determined by controller 1060, and 3D models of the user's eyes 1092 previously generated by the 3D reconstruction method may be adjusted by controller 1060 according to the magnitude and direction of the detected motion of the HMD 1000.

To track relative movement of the user's eyes 1092 with respect to the HMD 1000, the eye tracking system may also include eye odometers 1044 placed at one or more positions in the HMD 1000 to augment the eye tracking cameras 1040. The eye odometers 1044 may be used as a low-power component to track relative movement of the user's eyes 1092 with respect to the HMD 500 in intervals between the processing of frames captured by the cameras 1040. The 3D models generated by controller 1060 from the images captured by the eye tracking cameras 1040 provide absolute gaze information, while the data captured by the eye odometers 1044 in intervals between the processing of camera frames is processed by controller 1060 to provide a relative update to the previously known and trusted 3D models. This may allow the frame rate of the eye tracking cameras 1040 to be reduced, for example from 120 frames per second to 10 frames per second or less, and may also allow 3D reconstruction to be performed by controller 1060 much less often, thus significantly reducing power consumption by the eye tracking system. Augmenting eye tracking with the eye odometers 1044 may also significantly reduce bandwidth usage and latency of the eye tracking system. Examples of different technologies that may be used to implement eye odometers 1044 in an eye tracking system are given below in the section titled Example sensors.

As an alternative, in some embodiments, instead of using eye odometers 1044 in the HMD 1000 to track eye movement in intervals between frames, the eye tracking cameras 1040 may capture low-resolution frames in intervals between capturing high-resolution frames, for example by binning pixels on the camera sensor or by capturing horizontal and vertical stripes or lines of pixels on the camera sensor rather than entire frames. This low-resolution information may be processed by controller 1060 to track relative movement of the user's eyes 1092 with respect to the HMD 1000 in intervals between full, high-resolution frames captured by the eye tracking cameras 1040 and processed by the controller 1060.

Figure 11:
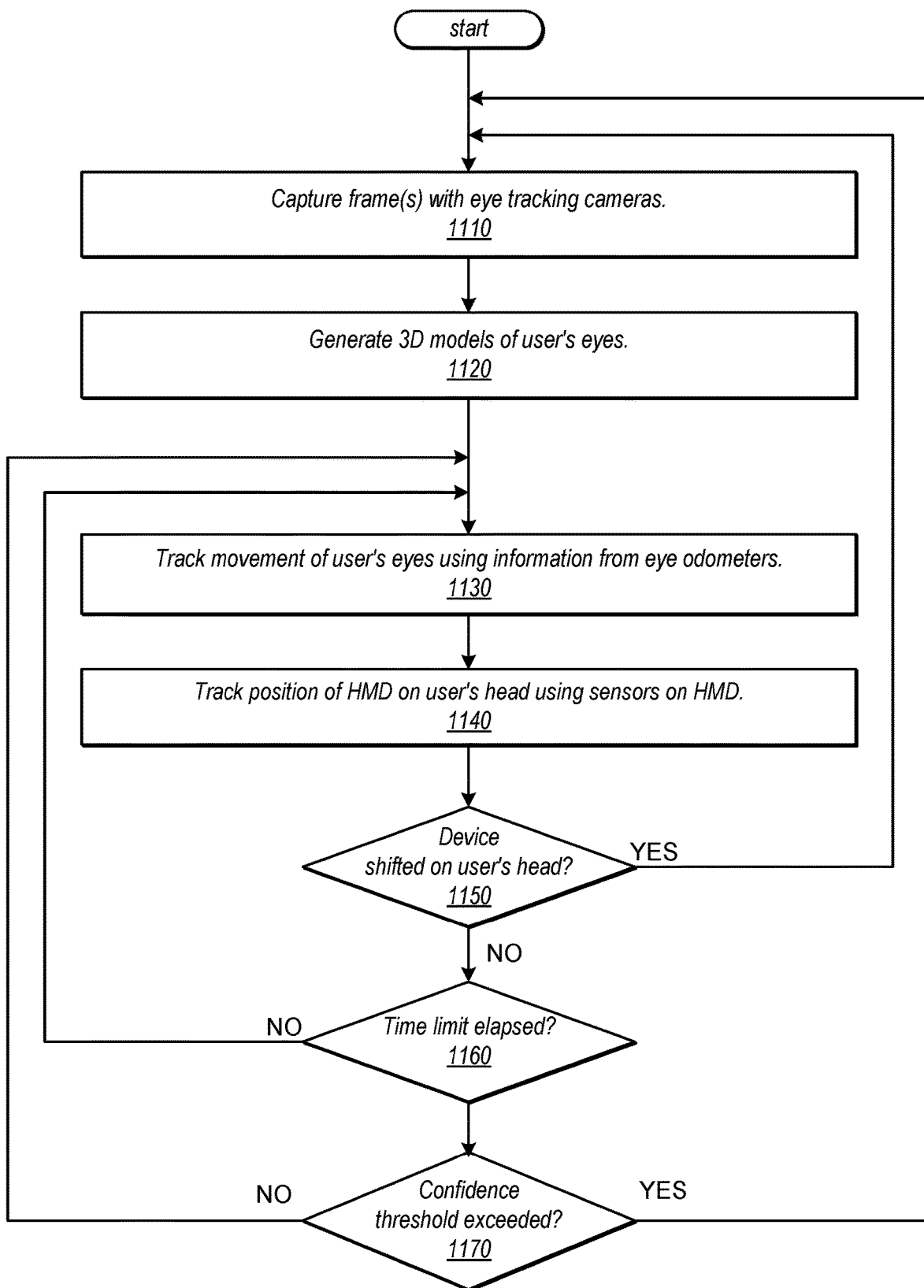
FIG. 11 is a flowchart of an eye tracking method in which head odometers are used detect movement of the HMD with respect to the user's eyes and eye odometers are used to track movement of the eyes in intervals between the processing of frames captured by the eye tracking cameras, according to some embodiments.

FIG. 11 is a flowchart of an eye tracking method in which head odometers are used detect movement of the HMD with respect to the user's eyes and eye odometers are used to track movement of the eyes in intervals between the processing of frames captured by the eye tracking cameras, according to some embodiments. The method of FIG. 11 may, for example, be performed in a VR/AR system as illustrated in FIG. 10. As indicated at 1110, one or more frames may be captured by the eye tracking cameras. As indicated at 1120, a 3D reconstruction method may be performed to generate 3D models of the user's eyes using the frame(s) captured by the eye tracking cameras. For example, the 3D reconstruction may be performed at initialization/calibration of the HMD. The 3D models of the eyes indicate the 3D position of the eyes with respect to the eye tracking cameras, which allows the eye tracking algorithms executed by the controller to accurately track eye movement with respect to the HMD.

As indicated at 1130, after performing an initial 3D reconstruction to generate 3D models of the eyes, movement of the user's eyes with respect to the HMD may be tracked in 2D space using data captured by and collected from the eye odometers on the HMD. As indicated at 1140, relative movement of the HMD with respect to the user's head may be tracked using head odometers on the HMD.

At 1150, if the controller detects movement of the HMD with respect to the user's eyes from the data received from the head odometers, the method returns to element 1110 to again perform the 3D reconstruction method to generate new 3D models of the user's eyes using frame(s) captured by the eye tracking cameras. Alternatively, magnitude and direction of the movement may be determined from the head odometer signals. This information may then be used by the controller to adjust the 3D models, which allows the eye tracking algorithms executed by the controller to continue to accurately track eye movement with respect to the HMD in 2D space without requiring 3D reconstruction to be performed.

At 1150, if movement of the HMD with respect to the user's head is not detected, and if a time limit has not elapsed at 1160, then the eye tracking method may continue at 1130 to track movement of the user's eyes with respect to the HMD using data from the eye odometers and at 1140 to track movement of the HMD with respect to the HMD using data from the head odometers. At 1160, if the time limit has elapsed, and if a confidence threshold for the eye tracking data has not been exceeded at 1170, then the eye tracking method may continue at 1130 to track movement of the user's eyes with respect to the HMD using data from the eye odometers and at 1140 to track movement of the HMD with respect to the HMD using data from the head odometers. At 1170, if the confidence threshold has been exceeded, the method returns to element 1110 to again perform the 3D reconstruction method to generate new 3D models of the user's eyes using frame(s) captured by the eye tracking cameras.

Embodiments of an eye tracking system for an HMD that include both head odometers and eye odometers as illustrated in FIGS. 10 and 11 may, for example, further reduce the frequency at which 3D reconstruction is performed, and may also reduce the frequency at which 2D image processing of frames captured by the eye tracking cameras is performed to further reduce power consumption of the eye tracking system.

Example Sensors

The following provides non-limiting examples of different technologies that may be used to implement head motion and eye motion sensors in an eye tracking system as illustrated in FIGS. 2 through 13. These technologies can be broken into three broad categories: drift compensation (1D) technologies, odometry (2D) technologies, and absolute tracking (5D) technologies.

Drift compensation technologies may work by contact, and may include odometry sensors in the HMD, for example in a nose pad of the HMD that make contact on the bridge of the user's nose and at the temple area of the HMD that make contact near the user's ears. The odometry sensors may measure force. Instead or in addition, the sensors may be capacitive sensors. As an alternative, accelerometers with a smart baseline may be used.

Odometry technologies may be broken into five categories: electric, optical, acoustic, radar, and pressure technologies. Electric odometry technologies may include, but are not limited to, EOG/EMG, ECG, and capacity sensor (waveguide or triangulation) technologies. Optical odometry technologies may include, but are not limited to, photosensor, photodiode array, proximity sensor, and scanner (TOF, intensity, or phase) technologies. Acoustic odometry technologies may include, but are not limited to, sonar (continuous wave, TOF, or resonance) technologies. Radar odometry technologies may include, but are not limited to, continuous wave or TOF radar technologies. Pressure odometry technologies may include, but are not limited to, an IMU (inertial measurement unit) or other sensor that senses pressure change from eye movement.

Absolute tracking technologies may be broken into two categories: optical and sonar technologies. Optical absolute tracking technologies may include, but are not limited to, single pixel TOF sensor technology or various camera technologies. The camera technologies may include, but are not limited to, DVS, CIS (RGB+IR), compressed sensing, skipping/binning (e.g., slit camera), and thermal imaging (short, medium, long, pyro-electric, or thermo-electric) technologies. Sonar absolute tracking technologies may include, but are not limited to, transceiver array, line of sight, and non-line of sight sonar technologies.

FIG. 12 is a block diagram illustrating an example VR/AR system that includes components of an eye tracking system as illustrated in FIGS. 2 through 11, according to some embodiments. In some embodiments, a VR/AR system may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eyepieces 2220A and 2220B. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 configured to implement functionality of the VR/AR system and to generate frames (each frame including a left and right image) that are displayed by the projector 2020. In some embodiments, HMD 2000 may also include a memory 2032 configured to store software (code 2034) of the VR/AR system that is executable by the controller 2030, as well as data 2038 that may be used by the VR/AR system when executing on the controller 2030. In some embodiments, HMD 2000 may also include one or more interfaces (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors 2050 that collect information about the user's environment (video, depth information, lighting information, etc.). The sensors 2050 may provide the information to the controller 2030 of the VR/AR system. In some embodiments, sensors 2050 may include, but are not limited to, visible light cameras (e.g., video cameras).

As shown in FIGS. 1, 2, 5, 7 and 10, HMD 2000 may be positioned on the user's head such that the displays 2022A and 2022B and eyepieces 2220A and 2220B are disposed in front of the user's eyes 2292A and 2292B. IR light sources 2230A and 2230B (e.g., IR LEDs) may be positioned in the HMD 2000 (e.g., around the eyepieces 2220A and 2220B, or elsewhere in the HMD 2000) to illuminate the user's eyes 2292A and 2292B with IR light. Eye tracking cameras 2240A and 2240B (e.g., IR cameras, for example 400×400 pixel count cameras or 600×600 pixel count cameras that operate at 850 nm or 940 nm, or at some other IR wavelength, and that capture frames at a rate of 60-120 frames per second (FPS)) are located at each side of the user's face. In various embodiments, the eye tracking cameras 2240 may be positioned in the HMD 2000 to provide a direct view of the eyes 2292, a view of the eyes 2292 through the eyepieces 2220, or a view of the eyes 2292 via reflection off hot mirrors or other reflective components. Note that the location and angle of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR light emitted by light sources 2230A and 2230B reflects off the user's eyes 2292A and 2292B is received at respective eye tracking cameras 2240A and 2240B, and is captured by the eye tracking cameras 2240A and 2240B to image the user's eyes 2292A and 2292B. Eye tracking information captured by the cameras 2240A and 2240B may be provided to the controller 2030. The controller 2030 may analyze the eye tracking information (e.g., images of the user's eyes 2292A and 2292B) to determine eye position and movement and/or other features of the eyes 2292A and 2292B. In some embodiments, to accurately determine the location of the user's eyes 2292A and 2292B with respect to the eye tracking cameras 2240A and 2240B, the controller 2030 may perform a 3D reconstruction using images captured by the eye tracking cameras 2240A and 2240B to generate 3D models of the user's eyes 2292A and 2292B. The 3D models of the eyes 2292A and 2292B indicate the 3D position of the eyes 2292A and 2292B with respect to the eye tracking cameras 2240A and 2240, which allows the eye tracking algorithms executed by the controller to accurately track eye movement.

In some embodiments, HMD 2000 may include sensors 2242 (referred to herein as head motion sensors or head odometers) placed at one or more positions in or on the device, for example at or near the user's ears (2242A) to primarily track pitch and at or near the bridge of the nose (2242B) to primarily track y movement. Signals from the head odometers 2242A and 2242B may be used to detect movement of the HMD 2000 with respect to the user's eyes 2292A and 2292B. This may allow 3D reconstruction to be performed only when movement of the HMD 2000 with respect to the user's eyes 2292A and 2292B has been detected, thus significantly reducing power consumption by the eye tracking system. When no movement of the HMD 2000 is detected, 2D image processing of frames captured by the eye tracking cameras 2240A and 2240B (which is much less expensive computationally than 3D image processing) may be performed to track the user's eyes 2292A and 2292B. In some embodiments, a 3D reconstruction may be performed periodically (e.g., once a second, or once every N frames) to prevent error/drift accumulation even if movement of the HMD 2000 has not been detected. In some embodiments, instead of performing 3D reconstruction when movement of the HMD 2000 with respect to the user's eyes 2292A and 2292B has been detected, magnitude and direction of the detected motion may be determined, and 3D models of the user's eyes 2292A and 2292B that were previously generated by the 3D reconstruction method may be adjusted according to the magnitude and direction of the detected motion of the HMD 2000. In these embodiments, a 3D reconstruction may be performed periodically (e.g., once a second, or once every N frames) to prevent error/drift accumulation.

In some embodiments, HMD 2000 may include sensors 2244 (e.g., photosensors or photodiodes, referred to herein as eye motion sensors or eye odometers) placed at one or more positions in the device to augment the eye tracking cameras 2240A and 2240B. The eye odometers 2244A and 2244B may be used as a low-power component to track relative movement of the user's eyes 2292A and 2292B with respect to the cameras 2240 in intervals between the processing of frames captured by the cameras 2240A and 2240B. This may allow the frame rate of the eye tracking cameras 2240A and 2240B to be reduced, for example from 120 frames per second to 10 frames per second, and may also allow 3D reconstruction to be performed much less often, thus significantly reducing power consumption by the eye tracking system. Reducing the frame rate of the eye tracking cameras 2240A and 2240B by augmenting eye tracking with the eye odometers 2244A and 2244B also significantly reduces bandwidth usage of the eye tracking system.

In some embodiments, instead of using sensors 2244A and 2244B to augment the eye tracking cameras 2240A and 2240B, the eye tracking cameras 2240A and 2240B may capture lower-resolution frames, for example by binning pixels or by capturing horizontal and vertical stripes of pixels, rather than entire high-resolution frames. The low-resolution frames captured by cameras 2240A and 2240B may be used to track relative movement of the user's eyes 2292A and 2292B with respect to the cameras 2240A and 2240B in intervals between the processing of full, high-resolution frames captured by the eye tracking cameras 2240A and 2240B. This may allow 3D reconstruction to be performed much less often, thus significantly reducing power consumption by the eye tracking system. In these embodiments, the eye tracking cameras 2240A and 2240B themselves may be viewed as "eye odometers" when capturing and processing the lower-resolution frames.

The head odometer methods and eye odometer methods described above may be used alone or in combination. Embodiments of an HMD 2000 may include head odometers 2242 to reduce power consumption of the eye tracking system. Embodiments of an HMD 2000 may include eye odometers 2244 (either implemented by sensors or by the eye tracking cameras) to reduce power consumption and bandwidth usage of the eye tracking system. In addition, embodiments of an HMD 2000 may include both head odometers 2242 and eye odometers 2244. Embodiments that include both head odometers 2242 and eye odometers 2244 may, for example, further reduce the frequency at which 3D reconstruction is performed, and may also reduce the frequency at which 2D image processing of frames captured by the eye tracking cameras 2240 is performed to further reduce power consumption of the eye tracking system.

The eye tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B; the estimated point of gaze may, for example, enable gaze-based interaction with content shown on the displays 2022A and 2022B. Other applications of the eye tracking information may include, but are not limited to, creation of eye image animations used for avatars in a VR or AR environment. As another example, in some embodiments, the information obtained from the eye tracking cameras 2240A and 2240B may be used to adjust the rendering of images to be projected, and/or to adjust the projection of the images by the projector 2020 of the HMD 2000, based on the direction and angle at which the user's eyes are looking. As another example, in some embodiments, brightness of the projected images may be modulated based on the user's pupil dilation as determined by the eye tracking system.

In some embodiments, the HMD 2000 may be configured to render and display frames to provide an augmented or mixed reality (AR) view for the user at least in part according to sensor 2050 inputs. The AR view may include renderings of the user's environment, including renderings of real objects in the user's environment, based on video captured by one or more video cameras that capture high-quality, high-resolution video of the user's environment for display. The AR view may also include virtual content (e.g., virtual objects, virtual tags for real objects, avatars of the user, etc.) generated by VR/AR system and composited with the projected view of the user's real environment.

Embodiments of the HMD 2000 as illustrated in FIG. 12 may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B.

Figure 13:
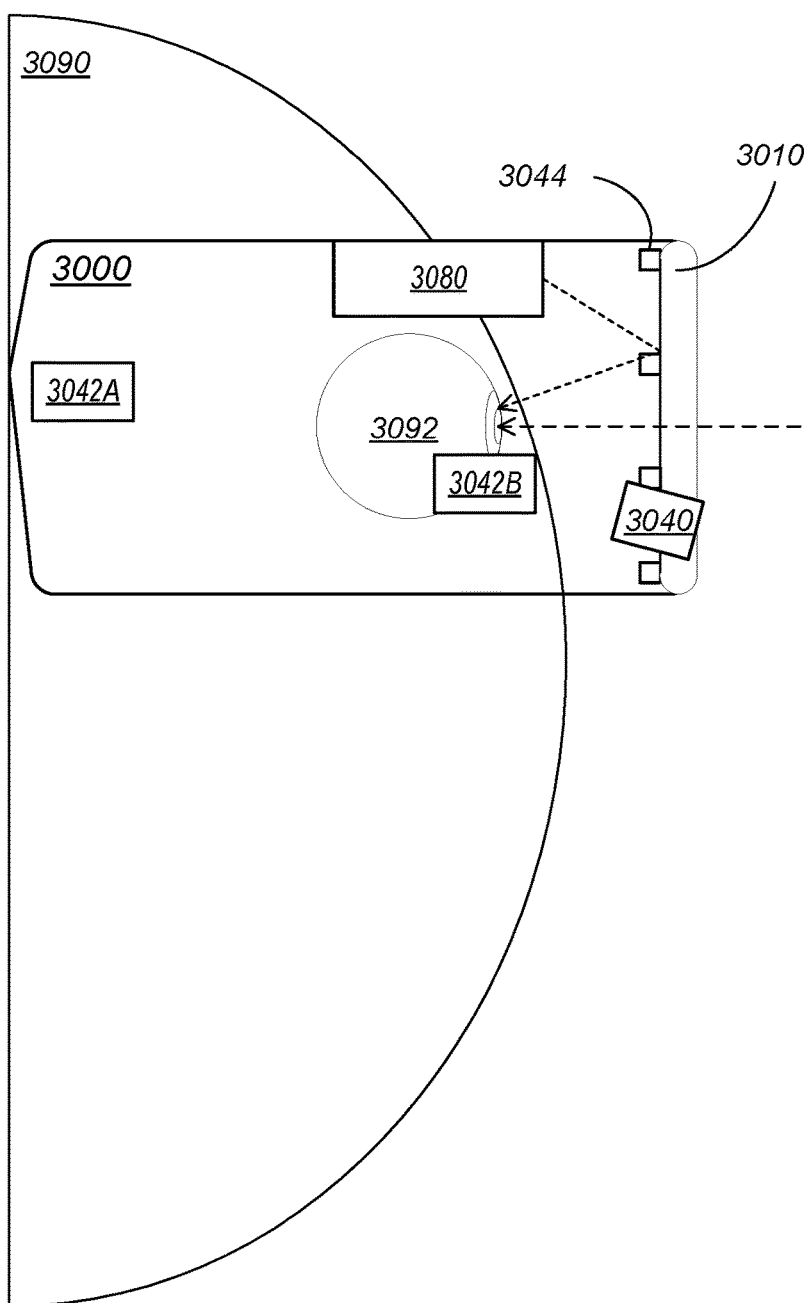
FIG. 13 illustrates an alternative VR/AR device that includes an eye tracking system with head odometers that detect movement of the device with respect to the user's eyes and eye odometers that track movement of the eyes in intervals between the processing of frames captured by the eye tracking cameras, according to some embodiments.

While embodiments are generally described in FIGS. 2 through 12 with respect to an example VR/AR system and HMD that includes near-eye display panels that the user views through eyepieces, embodiments of the low-power eye system methods and apparatus may be implemented in other types of VR/AR systems, and more generally in any system in which eye tracking is performed using eye tracking cameras. FIG. 13 illustrates an example alternative VR/AR device 3000 that includes an eye tracking system with head odometers 3042 that detect movement of the device 3000 with respect to the user's eyes 3092 and eye odometers 3044 that track movement of the eyes 3092 in intervals between the processing of frames captured by the eye tracking cameras 3040, according to some embodiments. Note that device 3000 as illustrated in FIG. 13 is given by way of example, and is not intended to be limiting. In various embodiments, the shape, size, and other features of the device 3000 may differ, and the locations, numbers, types, and other features of the components of the device 3000 may vary. In this device 3000, rather than having display panels that the user views through eyepieces, the device 3000 includes lenses 3010 that allow light from the outside environment to pass, and that are also configured to reflect light emitted by a projector/controller 3080 representing virtual content towards the user's eyes 3092, for example using a holographic film. Device 3000 may include an eye tracking system that, in addition to eye tracking cameras 3040, includes head odometers 3042 that detect movement of the device 3000 with respect to the user's eyes 3092 as described herein, eye odometers 3044 that track movement of the eyes 3092 in intervals between the processing of frames captured by the eye tracking cameras 3040 as described herein, or both head odometers 3042 and eye odometers 3044 as described herein.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
 a head-mounted device (HMD) comprising:
  at least one camera configured to capture images of a user's eyes at a frame rate of N frames per second; and
  one or more head motion sensors configured to detect motion of the HMD with respect to the user's head; and
 a controller comprising one or more processors configured to:
  perform an initial three-dimensional (3D) reconstruction based on at least one image captured by the at least one camera to generate initial 3D models of the user's eyes, wherein the initial 3D models indicate position of the user's eyes with respect to the at least one camera;
  perform two-dimensional (2D) image processing of one or more subsequent images captured by the at least one camera to track movement of the user's eyes with respect to the HMD until detecting that the HMD has shifted on the user's head based on signals from the one or more head motion sensors; and
  upon detecting that the HMD has shifted on the user's head based on the signals from the one or more head motion sensors, update the 3D models to indicate a new position of the user's eyes with respect to the at least one camera.

2. The system as recited in claim 1, wherein, to update the 3D models to indicate a new position of the user's eyes with respect to the at least one camera, the controller is configured to perform the 3D reconstruction based on at least one subsequent image captured by the at least one camera to generate new 3D models of the user's eyes.

3. The system as recited in claim 1, wherein, to update the 3D models to indicate a new position of the user's eyes with respect to the at least one camera, the controller is configured to adjust the initial 3D models based on magnitude and direction of movement of the HMD with respect to the user's head determined from the signals from the one or more head motion sensors.

4. The system as recited in claim 1, wherein the one or more head motion sensors include at least one sensor located in the HMD at or near the bridge of the user's nose and at least one sensor located in the HMD at or near the user's temples.

5. The system as recited in claim 1, wherein the HMD further comprises one or more eye motion sensors configured to detect movement of the user's eyes with respect to the HMD, wherein the controller is further configured to process signals from the eye motion sensors to track movement of the user's eyes with respect to the HMD in intervals between processing frames captured by the at least one camera.

6. The system as recited in claim 1, wherein the one or more cameras are configured to capture high-resolution frames and low-resolution frames.

7. The system as recited in claim 6,
 wherein the 3D reconstruction to generate 3D models of the user's eyes is performed on high-resolution frames captured by the one or more cameras; and
 wherein the 2D image processing is performed on low-resolution frames captured by the one or more cameras.

8. The system as recited in claim 6, wherein the controller is further configured to:
 process high-resolution images captured by the at least one camera to track movement of the user's eyes with respect to the HMD; and
 track movement of the user's eyes with respect to the HMD in intervals between the high-resolution frames captured by the at least one camera and processed by the controller.

9. The system as recited in claim 6, wherein the low-resolution frames are captured by binning blocks of pixels on a camera sensor or by capturing horizontal and vertical lines of pixels on the camera sensor.

10. The system as recited in claim 1, wherein the controller is a component of the HMD.

11. The system as recited in claim 1, wherein the HMD further comprises:
- at least one display screen configured to display frames containing the visual content for viewing by the user, wherein the controller is further configured to render the frames containing the visual content for display by the at least one display screen; and
- one or more light sources configured to emit light towards the user's eyes, wherein the at least one camera captures a portion of the light reflected off the user's eyes.

12. The system as recited in claim 11, wherein the HMD further comprises left and right optical lenses located between the at least one display screen and the user's eyes.

13. A method, comprising:
performing, by one or more processors:
- generating an initial three-dimensional (3D) model of a user's eye based on one or more images of the user's eye captured by a camera of a head-mounted device (HMD);
- processing subsequent images captured by the camera using two-dimensional (2D) image processing to track movement of the user's eye with respect to the HMD until detecting that the HMD has shifted on the user's head based on signals from one or more head motion sensors of the HMD; and
- updating the 3D model of the user's eye to indicate a new position of the user's eye with respect to the camera upon detecting that the HMD has shifted on the user's head based on the signals from the one or more head motion sensors of the HMD.

14. The method as recited in claim 13, wherein updating the 3D model to indicate a new position of the user's eye with respect to the camera comprises generating a new 3D model of the user's eye based on at least one subsequent image captured by the camera.

15. The method as recited in claim 13, wherein updating the 3D model to indicate a new position of the user's eye with respect to the camera comprises adjusting the 3D model based on magnitude and direction of movement of the HMD with respect to the user's head determined from the signals from the one or more head motion sensors.

16. The method as recited in claim 13, further comprising tracking movement of the user's eye with respect to the HMD in intervals between frames captured by the camera based on signals from one or more eye motion sensors of the HMD.

17. The method as recited in claim 13, wherein the camera is configured to capture high-resolution images of the user's eye and low-resolution images of the user's eye, and wherein the one or more processors are further configured to iteratively perform:
- processing a high-resolution image captured by the camera to track movement of the user's eye with respect to the HID; and
- processing one or more low-resolution images captured by the camera to track movement of the user's eye with respect to the HMD between high-resolution frames captured by the camera, wherein the low-resolution frames are captured by binning blocks of pixels on the camera's sensor or by capturing horizontal and vertical lines of pixels on the camera's sensor.

18. A device, comprising:
- at least one camera configured to capture high-resolution images and low-resolution images of a user's eyes;
- at least one head motion sensor configured to detect motion of the device with respect to the user's head; and
- a controller comprising one or more processors configured to:
  - process one or more high-resolution images captured by the at least one camera to generate initial three-dimensional (3D) models of the user's eyes, wherein the 3D models indicate position of the user's eyes with respect to the device;
  - signal the at least one camera to switch to low-resolution mode;
  - process one or more subsequent low-resolution images captured by the at least one camera to track relative movement of the user's eyes with respect to the device; and
  - upon detecting that the device has shifted on the user's head based on signals from the one or more head motion sensors:
    - signal the at least one camera to switch to high-resolution mode; and
    - process one or more subsequent high-resolution images captured by the at least one camera to update the 3D models to indicate a new position of the user's eyes with respect to the device.

19. The device as recited in claim 18, wherein the low-resolution images are captured in low-resolution mode by binning blocks of pixels on a camera sensor or by capturing horizontal and vertical lines of pixels on the camera sensor.

20. The device as recited in claim 18, wherein the high-resolution images are processed using 3D image processing, and wherein the low-resolution images are processed using two-dimensional (2D) image processing.

* * * * *